(12) United States Patent
Young

(10) Patent No.: US 7,580,488 B2
(45) Date of Patent: Aug. 25, 2009

(54) BROADBAND MODULATION/DEMODULATION APPARATUS AND A METHOD THEREOF

(75) Inventor: Randy K. Young, Port Matialda, PA (US)

(73) Assignee: The Penn State Research Foundation, University Park, PA (US)

( * ) Notice: Subject to any disclaimer, the term of this patent is extended or adjusted under 35 U.S.C. 154(b) by 1042 days.

(21) Appl. No.: 09/765,712

(22) Filed: Jan. 19, 2001

(65) Prior Publication Data

US 2005/0094719 A1    May 5, 2005

Related U.S. Application Data

(63) Continuation of application No. 09/725,832, filed on Nov. 29, 2000, now abandoned.

(51) Int. Cl.
*H04B 7/10* (2006.01)
(52) U.S. Cl. .................. 375/347; 375/267; 375/299
(58) Field of Classification Search ............... 375/222, 375/219–220, 295, 340, 316, 130, 140, 141, 375/146, 147, 249, 259, 205, 142, 144, 150, 375/260, 267, 299, 347, 376; 382/276; 455/38, 455/73, 39, 75
See application file for complete search history.

(56) References Cited

U.S. PATENT DOCUMENTS

| 1,342,885 | A | | 6/1920 | Armstrong |
| 3,571,503 | A | * | 3/1971 | McMann, Jr. ............ 178/6.7 |
| 4,065,718 | A | | 12/1977 | Attwood |
| 4,197,499 | A | * | 4/1980 | Henry et al. ............. 340/694 |
| 4,215,335 | A | * | 7/1980 | Doi et al. ................. 371/69 |
| RE30,468 | E | * | 12/1980 | Dolby .................... 455/72 |
| 4,382,299 | A | * | 5/1983 | Dieterich ................ 360/32 |
| 4,860,279 | A | | 8/1989 | Falk et al. |
| 4,862,478 | A | | 8/1989 | McIntosh |
| 4,882,775 | A | | 11/1989 | Coleman |

(Continued)

FOREIGN PATENT DOCUMENTS

EP    1 037 441 A    9/2000

OTHER PUBLICATIONS

Yu et al., "Exact Moment Matching Model of Transmission Lines and Application to Interconnect Delay Estimation", IEEE Transactions on VLSI Systems, vol. 3, No. 2, Jun. 1995, pp. 311-322.*

(Continued)

*Primary Examiner*—Chieh M. Fan
*Assistant Examiner*—Freshteh N Aghdam
(74) *Attorney, Agent, or Firm*—Nixon Peabody LLP

(57) ABSTRACT

A modulator/demodulator apparatus and method for applications, such as communications, active sensing and navigation is disclosed. The modulator time-delays and time-scales (compresses or dilates) an arbitrary, noise-like "base signal," then it sums this time-scaled and time-delayed version of the base signal with the original base signal to create a "signal pair" or doublet. The two signals in the doublet are completely overlapped in time and frequency. This doublet creation process can be repeated (with different base signals and/or different time-scale/time-delay parameters) and multiple doublets can be summed together and simultaneously transmitted. This demodulator uses the applied differential time-scale and differential time-delay to extract information, such as a message or a radar image, from the doublet.

91 Claims, 9 Drawing Sheets

U.S. PATENT DOCUMENTS

| | | | |
|---|---|---|---|
| 4,956,834 A | 9/1990 | Coleman | |
| 5,097,485 A | 3/1992 | O'Connor et al. | |
| 5,233,629 A | 8/1993 | Paik et al. | |
| 5,274,384 A | 12/1993 | Hussain et al. | |
| 5,285,478 A * | 2/1994 | Wornell et al. | 375/259 |
| 5,313,494 A * | 5/1994 | Park et al. | 375/59 |
| 5,329,547 A * | 7/1994 | Ling | 375/1 |
| 5,381,446 A * | 1/1995 | McIntosh | 375/1 |
| 5,561,431 A | 10/1996 | Peele et al. | |
| 5,570,351 A | 10/1996 | Wornell | |
| 5,581,036 A | 12/1996 | Chang et al. | 73/602 |
| 5,614,912 A | 3/1997 | Mitchell | |
| 5,625,642 A | 4/1997 | Wornell | |
| 5,687,196 A * | 11/1997 | Proctor et al. | 375/347 |
| 5,691,832 A | 11/1997 | Liedenbaum et al. | |
| 5,729,750 A | 3/1998 | Ishida | |
| 5,761,238 A | 6/1998 | Ross et al. | |
| 5,774,493 A | 6/1998 | Ross | |
| 5,786,780 A * | 7/1998 | Park et al. | 341/67 |
| 5,859,870 A * | 1/1999 | Tsujimoto | 375/143 |
| 5,926,502 A | 7/1999 | Schilling | |
| 5,963,581 A | 10/1999 | Fullerton et al. | |
| 5,990,823 A | 11/1999 | Peele et al. | |
| 6,031,862 A * | 2/2000 | Fullerton et al. | 375/200 |
| 6,154,482 A * | 11/2000 | Inuzuka | 375/130 |
| 6,178,317 B1 * | 1/2001 | Kroeger et al. | 455/296 |
| 6,320,915 B1 * | 11/2001 | Scott et al. | 375/340 |
| 6,330,289 B1 | 12/2001 | Keashly et al. | 375/297 |
| 6,385,237 B1 * | 5/2002 | Tsui et al. | 375/228 |
| 6,393,316 B1 * | 5/2002 | Gillberg et al. | 600/515 |
| 6,603,818 B1 * | 8/2003 | Dress, Jr. et al. | 375/295 |
| 6,603,821 B1 * | 8/2003 | Doi | 375/326 |
| 6,681,252 B1 * | 1/2004 | Schuster et al. | 709/227 |
| 6,879,716 B1 * | 4/2005 | Ishibashi | 382/166 |
| 2001/0053175 A1 * | 12/2001 | Hoctor et al. | 375/130 |
| 2004/0260415 A1 * | 12/2004 | Weiss | 700/94 |
| 2005/0008065 A1 * | 1/2005 | Schilling | 375/148 |

OTHER PUBLICATIONS

Kesler et al., "Experiments in Joint Doppler and Elevation Estimation in the Near Field", IEEE International Conference on Acoustics, Speech, and Signal Processing ICASSP 87, Apr. 1987, vol. 12, pp. 1778-1781.*

Dixon, "The What and Whys of Spread Spectrum Systems," *Spread Spectrum Systems*, $2^{nd}$ ed., New York, NY:John Wiley & Sons, Inc., Chapters 1, pp. 3-17 (1984).

Dixon, "Spread Spectrum Techniques," *Spread Spectrum Systems*, $2^{nd}$ ed., New York, NY:John Wiley & Sons, Inc., Chapters 2, pp. 18-32 (1984).

Young, "Introduction/Background," *Wavelet Theory and Its Applications*, Boston, MA:Kluwer Academic Publishers, Chapter 1, pp. 1-17 (1993).

Young, "The Wavelet Transform," *Wavelet Theory and Its Applications*, Boston, MA:Kluwer Academic Publishers, Chapter 2, pp. 19-31 (1993).

* cited by examiner

BROADBAND MODULATION/DEMODULATION APPARATUS AND A METHOD THEREOF

This application is a continuation application of application Ser. No. 09/725,832 filed on Nov. 29, 2000, now abandoned which is herein incorporated by reference.

FIELD OF THE INVENTION

This invention relates generally to a modulation/demodulation apparatus and method and, more particularly, to an apparatus and method for communicating and/or extracting information through/from an environment.

BACKGROUND OF THE INVENTION

In communications applications, message information is modulated onto the transmitted signal and a receiver system must demodulate (detect and extract) the embedded message information. In active imaging applications, imaging information regarding the environment is embedded onto the modulated transmit signal and a receiver system must demodulate (detect, extract and estimate) the embedded environmental imaging information. The transmitted signals in these applications may undergo many transformations as they propagate and before they are received. More specifically, phenomenon, such as multipaths, clutter, dispersion, motion, jamming, intercepts, and/or spoofing, may degrade the transmitted signal prior to reception by the receiver. Further, cost-performance tradeoffs may result in additional degradation of the signal at the transmitter and/or receiver, i.e. the need to use simple and less expensive transmitter and receiver apparatuses to keep costs down often cause further degradations in signal quality. Accordingly, there is a need for apparatuses and/or methods that efficiently and effectively modulate/embed information and efficiently and effectively demodulate (detect and extract) the embedded information while rejecting undesired information.

More specifically, the desirable features of a modulated signal in such an apparatus and/or method should include: stealth/security; utilization of all available degrees of freedom in space (aperture), time (duration) and frequency (bandwidth); low cost implementation; and immunity/robustness to degradations due to low cost implementations (non-linearities, dispersion), channel/environmental degradations (multipaths and angular/time/frequency dispersion), relative motion, antenna/transducer mismatch and imperfections, and intentional denial (countermeasures: jamming, spoofing, repeating).

Additionally, the demodulator should be able to efficiently detect and extract the embedded information with a low cost implementation by utilizing all available degrees of freedom and coherently combining desired energy while simultaneously minimizing undesired energy in the received signal. Further, the overall information extraction must be maximized: the information transfer rate must be high, with little erroneous information (false alarms/detects); the information must be accurate and precise (robust high resolution estimates of range/angular/velocity for probing and navigation systems); and the extracted information should be hierarchically accessible (low resolution through high resolution access). All of these features should be simultaneously achieved.

Prior apparatuses and methods have tried to solve these problems and realize these desirable features, but without complete success. Typically, prior art modems or modulator/demodulators have embedded/extracted the desired information onto/from the amplitude, frequency, time, codes, and/or phase of a "base signal," which is a sinusoidal or tonal signal. These apparatuses and/or methods have used a variety of well known modulation/demodulation techniques, including time-differential modulation, coherence multiplexing, transmitted reference communications, wavelet transform encoding/decoding, and ultra-wideband communications.

One example of a prior system which uses one or more of the techniques described above is disclosed in U.S. Pat. No. 4,065,718 to Attwood which is herein incorporated by reference. This prior system uses time differential modulation. One of the most significant problems with this system is its sensitivity to multipath degradations and its ability to be detected and exploited by eavesdroppers. The applied time-delay offset can be easily "realized" by the propagating environment (as a multipath) causing a false detection. Additionally, this modulation is easily detected by an eavesdropping listener (with a delay element in their processor). Furthermore, when this prior art modulator/demodulator is employed for probing or imaging as in radar, navigation, sonar and/or identification-friend-or-foe (IFF), the range/angle/velocity resolution performance is very poor. As a result, the problems of non-robustness, insecurity and poor performance limit the practical utility of this system.

Another example of prior apparatuses and/or methods which attempt to solve the problems discussed earlier are disclosed in U.S. Pat. Nos. 5,691,832, 4,860,279, 4,882,775, and 4,956,834 which are all herein incorporated by reference. These prior systems utilize optical modulation. More specifically, these systems utilize a single base signal and create a transmit signal by adding the original signal to a time-delayed version of the original signal and transmitting that composite signal pair. There is no no time-scale offset applied by this system. A significant shortfall of these systems is that if the propagating environment creates multipaths that are also on the order of the applied time-delay, performance can be significantly degraded due to false detections. Additionally, any eavesdropping listener or intercept receiver can easily detect the presence of this signal with a simple autocorrelative receiver. Further, the spatial resolution of a sum of delay-offset signals is proportional to the spatial extent of the signal (the duration of the signal multiplied by the speed of propagation in that medium) and this spatial/range resolution is very poor for long duration signals. Even further this signal has almost no relative velocity sensitivity and, as a result, velocity can not be used as a discriminator.

Another example of prior apparatuses and/or methods which attempts to solve the problems discussed earlier are disclosed in U.S. Pat. Nos. 5,761,238, 4,862,478, 5,774,493, and 5,774,493 which are all herein incorporated by reference. These prior systems utilize a transmitted reference and the code-division multiple-access ("CDMA") modulation technique. In these systems, a reference signal is transmitted in a dedicated channel (analogous to a pilot signal). The transmitted reference signal is received and recovered as best as possible. The remainder of the received signal is demodulated by this estimated reference signal. A major limitation of CDMA systems is that reliably estimating the reference signal to high fidelity is very hard to do practically and suffers when the reference signal recreation is less than perfect. Obviously, any propagating environment that severely degrades the signal-of-interest will also severely degrade a transmitted reference signal. Simple linear correlation to recover the transmitted reference will not account for frequency dispersive, time-varying or non-linear degrading phenomenon. CDMA configurations with embedded pilot signals and RAKE receivers have the same limitations (low cost implementations are non-linear, frequency dispersive and time-varying). For all of these techniques, the receiver requires detailed knowledge of the reference and/or pilot channel (the code must be known). Further, stringent synchronization with the reference signal must be achieved to decode the embedded information; most CDMA receivers require extensive processing to synchronize the "code signal" with the received signal.

Yet another example of prior apparatuses and/or methods which attempt to solve the problems discussed earlier are disclosed in U.S. Pat. Nos. 5,729,750, 5,233,629, 5,963,581, 5,570,351, 5,625,642, and 5,561,431 which are all herein incorporated by reference. These prior systems utilize new modulations, such as orthogonal CDMA-multi-carrier, ultra-wideband, and wavelet. The inherent disadvantage of these systems is that they employ highly structured, and very limited "base signals" that are really just filter coefficients. None of these systems transmits signal pairs and modulate the relative offsets between those pairs. Only one base signal is used in a wavelet transform technique and it is termed the "mother wavelet" or "analyzing wavelet." As a result, the sensitivity of these modulations follows that of CDMA—the analyzing wavelet must be known to extract the embedded information and any significant degradations of this reference signal will defeat information extraction. Additionally, the demodulators are not auto-correlative, they are matched filters with filter coefficients that replicate the "code signal" and require linear, dispersionless and intensive processing.

Yet another example of a prior system which attempts to solve the problems discussed earlier is disclosed in U.S. Pat. No. 5,990,823 which is herein incorporated by reference. This prior system discloses a wavelet-based radar. As with most wavelet-based sensing, the transmitted signal acts as the reference signal and the received signal is correlated against time-scaled and time-delayed versions of the transmitted signal (the time-scale and time-delay are induced by relative motion and the range, respectively, to scatterers in the environment). The problem with this prior system is that the velocity resolution is controlled by the time-scale resolution and is normalized by the speed of light. To estimate velocities less than 500 mph requires unreasonably long, coherently processed receive signals (multiple seconds).

Accordingly, as illustrated in the discussion above prior apparatuses and/or methods fail to simultaneously realize all or even most of the aforementioned desirable features or goals. For example, to be secure most active systems must use low power transmissions and signals that possess both long durations and high bandwidths (high time-bandwidth product signals). However, although these qualities are desirable for security, they are undesirable for robust detection, low cost implementations and efficiency. A spread spectrum modulation scheme requires expensive linear and matched components, high rate processing, almost perfect synchronization, minimum dispersion and detailed knowledge of the signal structure at both ends of the modem. Thus, design tradeoffs occur that sacrifice either security, performance and/or costs. Each of the desirable features usually have conflicting requirements leading to trade off performance in one feature for lack of performance in another feature. None of the prior apparatuses and/or methods simultaneously solves these tradeoff problems.

Additionally, prior systems that transmit the sum of two offset copies of a signal suffer from poor range/angle/velocity resolution; potential exploitability; sensitivity due to multipaths; and very low information transfer/extraction rates. The prior art that employs high time-bandwidth product signals or "coded signals," suffer from very high processing requirements; expensive precision components and element arrays; extreme sensitivity to frequency dispersion, relative motion, and non-linearities; and the requirement that all users of the signals "know the codes." When a propagating environment or sensor system significantly degrades the coherence of the received signal relative to the transmitted signal, the performance of these high time-bandwidth product signal techniques degrade rapidly; the "matched filter processor" is no longer matched.

SUMMARY OF THE INVENTION

A system in accordance with one embodiment of the present invention includes a transmitter and a receiver that, respectively, modulate and demodulate a transmitted signal. The modulator generates a pair of identical or substantially identical base signals. One of these base signals is then time scaled (time compressed or dilated) relative to the other base signal. One of these base signals is also time delayed relative to the other base signal. The combined offsets in time scale and time delay are the modulation parameters. The offset pair of base signals are combined, e.g. added, to form a doublet signal; this doublet signal is transmitted. The demodulation operations in the receiver process the received signal by forming multiple, identical channels from the received signal and relatively time scaling each channel by one of the possible time scales applied by the modulator. This relative time scaling of the received signal can be realized by sampling the signal at a different sampling rate, e.g. sampling one channel at 1 MHz and another channel at 0.999 MHz realizes a relative time scaling between channels of 0.999. Pairs of these relatively time scaled channels are cross correlated to form correlator outputs for each relative time scale offset. A correlator output indicates the energy at a particular time delay offset between the two processed signals; thus, the demodulator output (across multiple relative time scales and multiple time delays from the correlation) indicates the energy distribution between relatively time scaled and time delayed versions of the received signal. This energy distribution should peak at the time scale and time delay offset(s) applied by the modulator/transmitter when a portion of the transmitted signal is present in the received signal.

A modulator/demodulator system in accordance with one embodiment of the present invention includes a transmission system and receiving system. The transmission system applies one of a plurality of time scales and one of a plurality of time delays to one of a pair of substantially matched base signals, combines the time scaled and time delayed base signal with the other one of the pair of base signals to form a doublet, and transmits the doublet. The receiving system receives the doublet and extracts information from the doublet based on the one of the plurality of time scales and the one of the plurality of time delays which were applied.

A modulation/demodulation method in accordance with another embodiment of the present invention includes a few steps. One of a plurality of time scales and one of a plurality of time delays are applied to one of a pair of substantially matched base signals. The time scaled and time delayed base signal are combined with the other one of the pair of base signals to form a doublet and the doublet is transmitted into the environment. The doublet is received and information is extracted from the doublet based on the one of the plurality of time scales and on the one of the plurality of time delays which were applied.

A modulation/demodulation system in accordance with another embodiment of the present invention also includes a transmission system and a receiving system. The transmission system applies one of a plurality of time scales to one of a pair of substantially matched base signals, combines the time scaled base signal with the other one of the pair of base signals to form a doublet, and transmits the doublet. The receiving system receives the doublet and extracts information from the doublet based on the one of the plurality of time scales which was applied.

A modulation/demodulation method in accordance with another embodiment of the present invention also includes the following steps. One of a plurality of time scales is applied to one of a pair of substantially matched base signals. The time scaled base signal is combined with the other one of the pair of base signals to form a doublet and the doublet is transmitted into the environment. The doublet is received and the information is extracted from the doublet based on the one of the plurality of time scales which was applied.

A transmission system for transmitting information in accordance with yet another embodiment of the present invention includes an encoding system, a combiner, and a transmitter. The encoding system applies one of a plurality of time scales and one of a plurality of time delays to one of a pair of substantially matched base signals. The combiner combines the time scaled and time delayed base signal with the other one of the pair of base signals to form a doublet. The transmitter transmits the doublet with the information.

A method for transmitting information in accordance with yet another embodiment of the present invention includes a few steps. One of a plurality of time scales is applied to one of a pair of substantially matched base signals. The time scaled base signal is then combined with the other one of the pair of base signals to form a doublet with the information ready for transmission.

A receiver system for receiving transmitted information in accordance with yet another embodiment of the present invention includes a receiver and a processing system. The receiver receives a doublet and the processing system extracts the information from the doublet based on one of a plurality of time scales which was applied to the doublet prior to transmission.

A receiving method for receiving information in accordance with yet another embodiment of the present invention includes receiving a doublet and then extracting information from the doublet based on one of a plurality of time scales which was applied to the doublet.

The present invention solves the problem of achieving reliable, robust and accurate information transfer and extraction in adverse environments. It provides an information modulation/demodulation (modem) process and apparatus that solves the tradeoff problem of simultaneously achieving robustness, security, high rate information transfer, and spatial processing gain with low cost/complexity implementations. Additionally, the present invention provides for the easy and efficient, coherent combination of the received signals at multiple receivers that are spatially separated and potentially poorly matched. Further, the present invention lowers the cost of equipment and simultaneously enhances the performance of systems that transfer message information and extract information from signal propagating environments. Even further the present invention enables the simultaneous accomplishment of both the active sensing goal and the communications goal with the same hardware/apparatuses and even the same transmitted energy.

The new information modulation/demodulation apparatuses and/or processes feature the embedding or extracting of information from a set of specially modulated signal pairs, termed doublets. Each doublet comprises an arbitrary, high time-bandwidth product signal (noise-like signal) referred to as the "base signal" and an offset copy of that base signal. These two signals are then added together to form a signal pair or doublet. Information is embedded in the "offset." One of the unique aspects of this modulation/demodulation technique is due to its offset parameters being differential time-delay and differential time-scale. Multiple doublets can be used simultaneously to form a composite transmit signal. The composite signal is transmitted to communicate and/or extract information.

The underlying robustness of the present invention is primarily due to the structure of the doublet. The applied differential time-scale (compression or dilation) will be close to unity (unity time-scaling implies no compression or dilation) and the applied time-delay offset will be small relative to the length of the signal. Thus, each component of the doublet has approximately the same frequency content and the same signal structure at a given time. Since the two components are substantially identical, the channel, environment, transducers, nonlinear electronics, relative motion, etc., all affect both components substantially identically as well. Thus, even though the received signal may not resemble the transmitted signal at all, the two components of the doublet will closely resemble each other; they will be highly correlated. The differential offset between two components of the doublet will be easily detectable and can be accurately and precisely estimated. Therefore, information embedded in the offset can be robustly extracted despite serious received signal degradations. A matched filter receiver would perform poorly, but this new time-scale/time-delay offset modem will achieve almost all of the high time-bandwidth product gain associated with the base signal.

The present invention's added parameter of time-scale offset is easy and efficient to implement, and it adds a whole new dimension for embedding/extracting information and maintaining signal security. The time-scale offset also enables controllable spatial resolution for enhanced performance in extracting environmental information. By simultaneously employing multiple time-scale offsets in the same transmission, the system can simultaneously achieve extreme robustness and high resolution in range, angles and velocity.

In prior art, a naturally occurring multipath can create a composite signal that has the original signal summed with a delay-offset version. If the multipath delay is in the valid range of applied delays, this will lead to a false alarm at the prior art receiver. With the present invention, the propagating environment can not "realize" any operations that differentially offset the time-scale between the simultaneously transmitted base signals; thus the potential for naturally occurring false alarms is alleviated. Also, for this modem to be susceptible to eavesdropping listeners, the listeners would have to know this modulation and hypothesize the entire set of potential time-scale/time-delay offsets on very high time-bandwidth product signals, which is a very difficult and demanding task; thus, this modem provides signal security as well. The time-scale offset of this invention is further exploited to achieve accurate and precise range/angle/velocity estimates for probing/imaging applications. None of the prior art modulator/demodulators directly pertain to this modulator/demodulator (modem) and the solution(s) delivered by this modem solve many of the tradeoff problems addressed only partially by the related prior art.

DETAILED DESCRIPTION OF THE INVENTION

Figure 1:
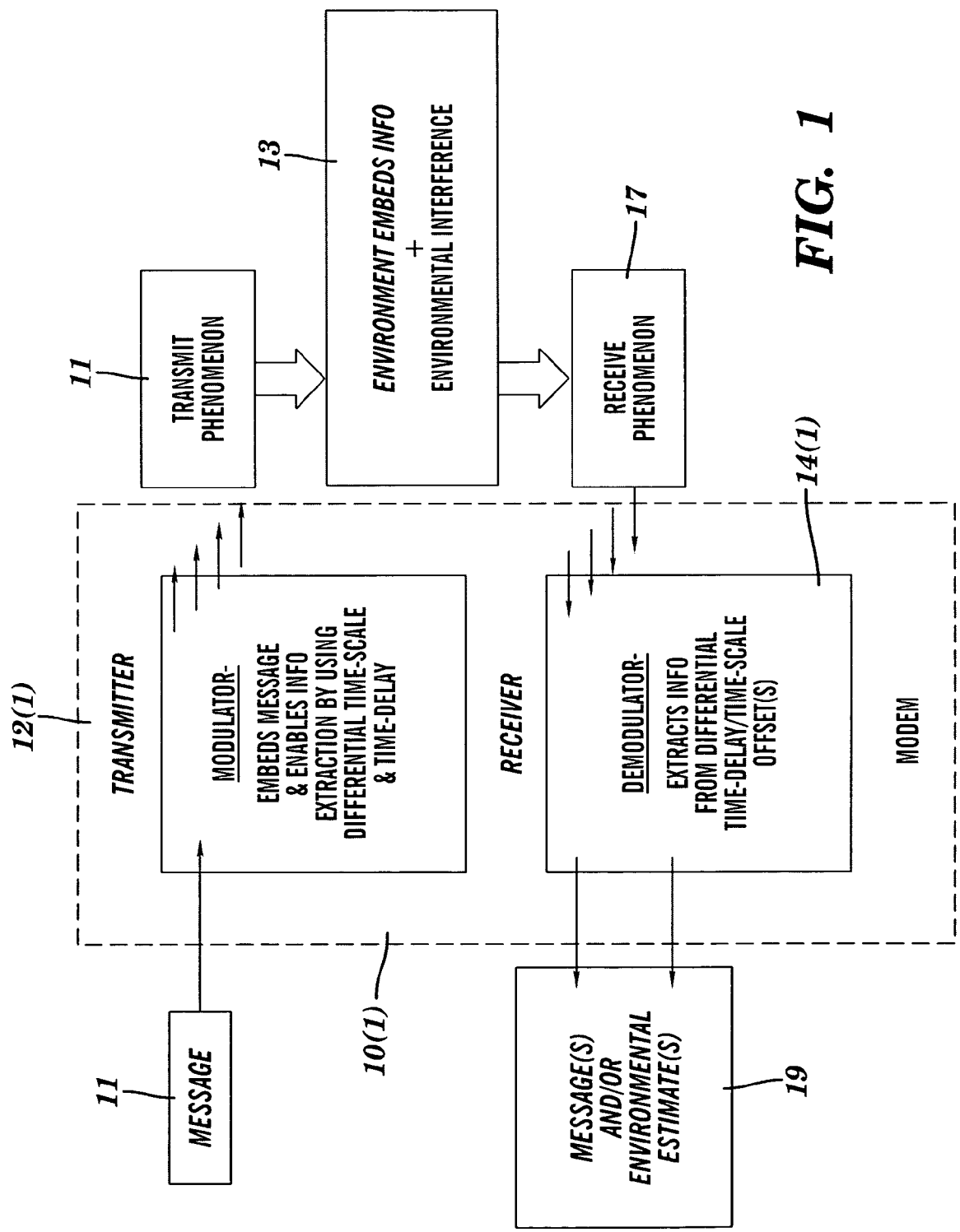
FIG. 1 is a partial block diagram and partial flow chart of modulation/demodulator system in accordance with one embodiment of the present invention.

An apparatus and method 10(1) for communicating and/or extracting information through and/or from an environment in accordance with one embodiment of the present invention is illustrated in FIG. 1. The apparatus 10(1) includes a modulator 12(1) and a demodulator 14(1). One of the advantages of the present invention is that it solves the problem of simultaneously achieving robustness, security, high rate information transfer, and spatial processing gain with low cost/complexity system. The present invention is efficient, robust and secure and can be used in variety of different applications, such as communications and/or imaging, such as with radar, sonar, navigation, lidar, acoustic, and other active probing/imaging systems and also in other applications such as water marking.

Figure 2:
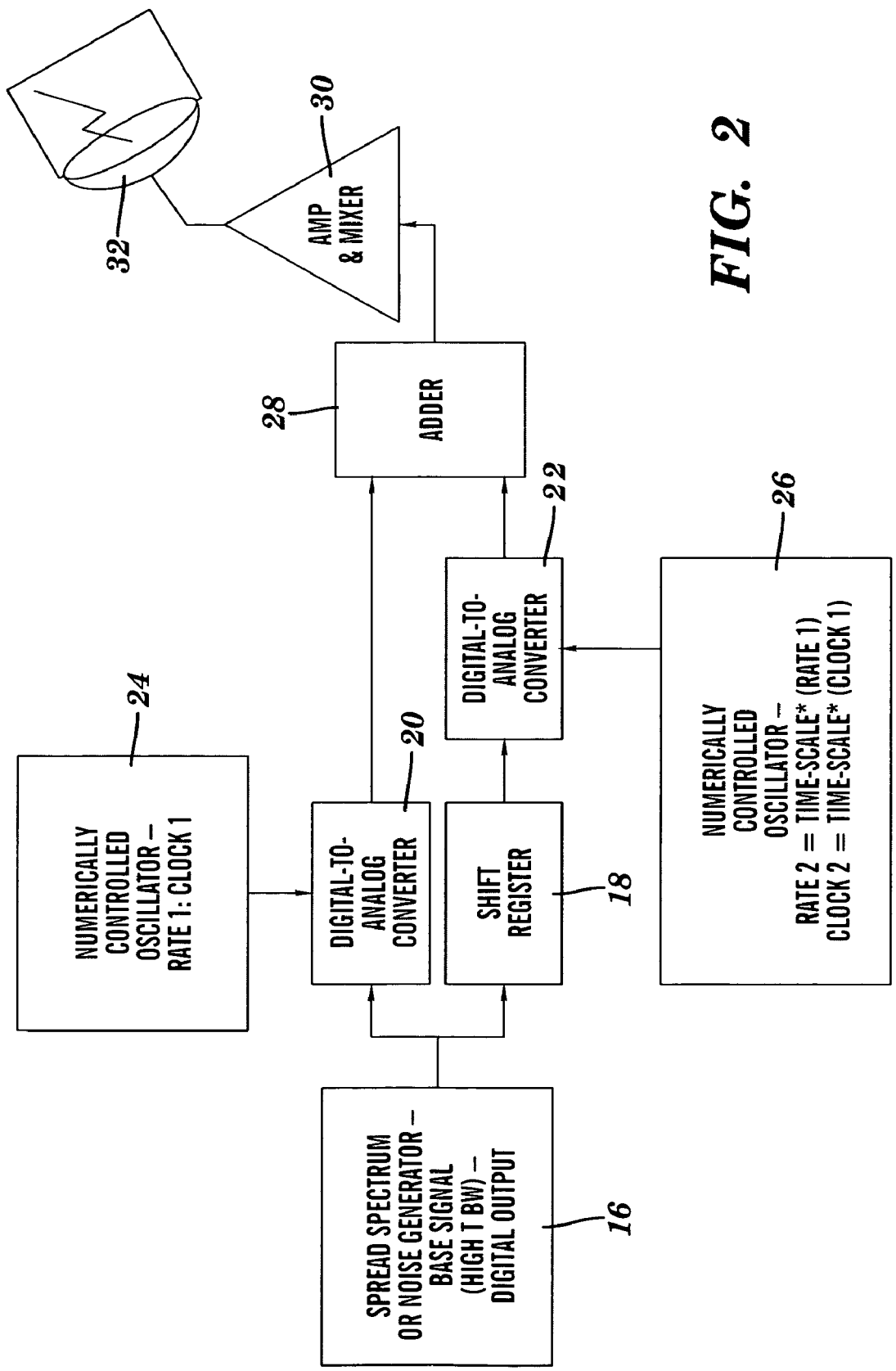
FIG. 2 is a partial block diagram and partial flow chart of one embodiment of a transmission system for the system shown in FIG. 1.

Referring to FIGS. 1 and 2, the apparatus 10(1) has a modulator 12(1) in accordance with one embodiment of the present invention. The modulator 12(1) includes a signal generator 16 that generates an arbitrary, high time-bandwidth product signal (noise-like signal) that is also referred to as the "base signal." This base signal could also be an information bearing signal. The physical phenomenon generating this signal can be electromagnetic, light wave, acoustic, ultrasonic or any other wave propagating phenomenon.

The signal generator 16 is coupled to a time delay offset device, a shift register 18, and to a digital-to-analog (D/A) converter 22. The signal generator 16 is also coupled to another D/A converter 20. A controlled oscillator 24 is coupled to D/A converter 20 and a controlled oscillator 26 is coupled to D/A converter 22. In this particular embodiment, the shift register 18 is used to affect the relative time-delay offset between base signals and D/A converters 20 and 22 along with controlled oscillators 24 and 26 are used to affect the relative time-scaling offset between base signals. The two controlled oscillators run at frequencies that are "offset" by the applied time-scale offset. Other types of components can also be used to affect the relative time-delay and/or the time scaling offset between base signal pairs.

An adder 28 is coupled to the D/A converter 20 and to the D/A converter 22 to combine the base signals to form the doublet signal from the pair of relatively offset base signals. Other types of devices which combine signals can also be used, such as a subtractor.

A signal transmission system 30 is coupled to the adder 28 and may perform one or more operations on the combined base signals or doublet signal well known to those of ordinary skill in the art, such as amplification, frequency conversion, filtering, equalization, and/or clipping, to prepare the doublet signal for transmission. The amplification, frequency conversion, filtering, equalization, and/or clipping that conditions both the doublet signal for transmission and the received signal can be both efficient and low cost. The amplification can be non-linear and have significant variability over both frequency and time. The amplification and filtering can be mismatched between receive elements so that tedious and expensive phase matching across an array of sensors is not required. The frequency conversion process can be accomplished by lower cost devices, such as diodes due to the acceptance of non-linearities and imprecision.

The equalization should be applied in both time and frequency. Equalization distributes the signal's energy evenly across time and/or frequency. For temporal equalization the simplest equalization is amplitude clipping or saturation amplification. Both of these techniques convert a signal with varying amplitudes to a signal with a constant amplitude that only varies in the sign of the amplitude, creating a signal that has a constant power across time. Another temporal equalization approach for bandpass signals is to create a quadrature signal from the desired information signal such that the overall signal maintains a constant amplitude. Mathematically, given a signal, I(t), and an amplitude, A, a second signal is created that follows the relationship $Q(t)=sqrt[A^2-I^2(t)]$. The modulated bandpass signal for transmission is then generated according to $B(t)=[I(t) \sin(\omega t)+Q(t) \cos(\Omega t)]$. This signal, B(t), will possess constant power across time.

Analogously, frequency or spectral equalization distributes the energy of a signal evenly across a particular region of frequency; each frequency band has a similar amount of energy and power. Many methods for spectral equalization exist and can be utilized, however, this application does not require strict demands on the equalization, such as linear phase, minimum delay, etc., so simple, efficient and low cost spectral equalization can be implemented. One of the simplest approaches is to transform the signal into the frequency domain and discard the amplitude information in the frequency domain, only processing the phase information. Another simple implementation is to divide the spectrum into bands of a fixed size and normalize the energy in each band to the same constant, e.g., one. Thus, each frequency band contributes and equal amount (same energy in each band) to the correlation. These simple spectral equalizers are not intended to be all encompassing, but to simply represent by way of example the efficient implementation of the frequency equalization process for the robust broadband modulation which could be used.

A transduction system 32, such as one or more antennas or other transduction elements, is coupled to the signal transmission system or device 30 and is used to transmit the doublet signal into the environment. Since other components of a modulator along with their interconnections and operations are well known to those of ordinary skill in the art they will not be discussed here.

The basic math underlying the modulator/transmission system 12(1) is:

$$\text{Transmit}(t) = O\left[\sum_i [b_i(t) + b_i(s_i(t - \tau_i))]\right]$$

where the message information can be embedded both in the base signals, $b_i(t)$, and in the relative offsets in the time delay and time-scale parameter pairs:

$$(S_i, \tau_i)$$

Figure 3:
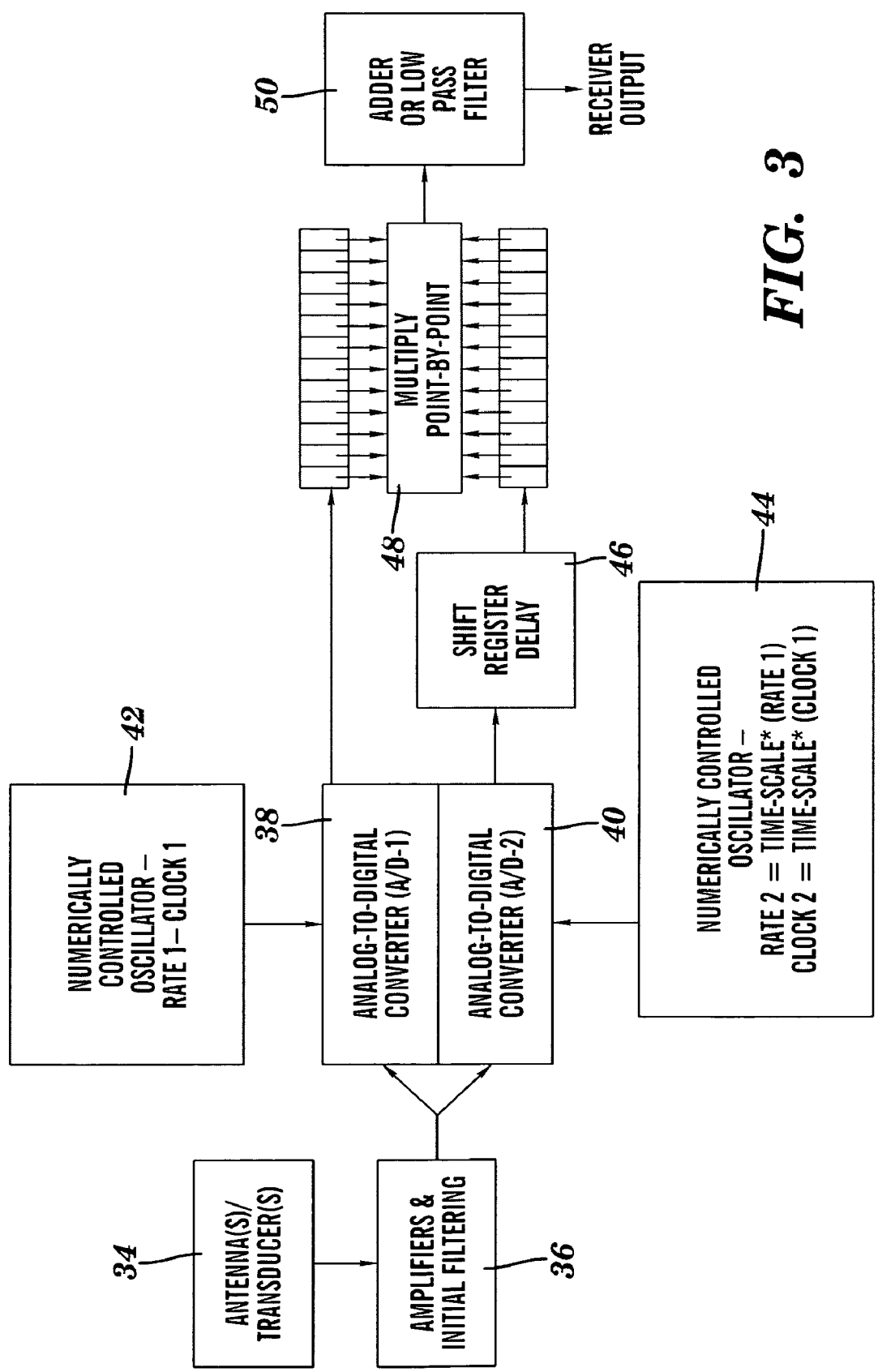
FIG. 3 is a partial block diagram and partial flow chart of one embodiment of a receiving system for the system shown in FIG. 1.

Referring to FIGS. 1 and 3, the apparatus 10(1) also has a demodulator or receiving system 14(1) in accordance with one embodiment of the present invention. The demodulator 14(1) includes a transduction system 34, such as one or more antennas or other transduction elements, which convert impinging phenomenon, such as electromagnetic variations, into a signal appropriate for processing and information extraction.

The transduction system 34 is coupled to a signal conditioning system 36 which may perform one or more operations on the received signal well known to those of ordinary skill in the art, such as amplification, frequency conversion, filtering, equalization, and/or clipping.

Analog-to-digital ("A/D") converters 38 and 40 are coupled to the signal conditioning system 36, and are used to sample the conditioned received signal at two (or more) different sample rates to achieve the relative time-scale offset. Other types of relative time-scaling devices could be used. A controlled oscillator 42 is coupled to the A/D converter 38 and a controlled oscillator 44 is coupled to the A/D converter 40. The sample rates for the A/D converters 38 and 40 are controlled by the controlled oscillators 42 and 44, respectively, and the relative time-scale offset is the ratio of the two oscillator's frequencies.

A shift register 46 is coupled to the A/D converter 40 and realizes the time-delay offset between the two signal paths. Other types of devices and systems to realize a time-delay can be used.

A multiplier 48 is coupled to A/D converter 38 and to the shift register 46 and combines the signals from the two paths through point-by-point multiplication, although other types of combiners can be used.

A low pass filter or adder 50 is coupled to the multiplier 48 and adds the results of the multiplication together, although other types of devices, such as an integrator can be used in place of the low pass filter 50. Since other components of a demodulator along with their interconnections and operations are well known to those of ordinary skill in the art they will not be discussed here.

The operation of the apparatus 10(1) in accordance with one embodiment of the present invention will be discussed with reference to FIGS. 1-3. Referring to FIGS. 1 and. 2, an arbitrary, high time-bandwidth product base signal (noise-like signal) is generated by signal generator 16. The base signal may have information embedded on it with standard modulation formats. Next, an offset copy of that base signal is formed by using a shift register 18 to time-delay one base signal and then applying the original base signal and the time-delayed base signal to a pair of digital-to-analog converters 20 and 22 that are clocked at offset rates by two numerically controlled oscillators 24 and 26 to affect the time-scaling. The ratio of the two clock frequencies is the applied time-scale offset. The two signals are then added together by an adder 28 (the sum can be a weighted sum) to form a base signal pair or a doublet signal, although other types of combiners, such as a subtractor, can be used. Next, the doublet signal is transformed appropriately for transmission with a device 30 which performs operations well known to those of ordinary skill in the art, such as frequency mixing, amplification, filtering, clipping, and/or equalizing, on the doublet signal. The doublet signal is then transmitted by transduction system 32. Information is embedded in the time delay and time-scale "offset," although information could be embedded with only the time-scale or time-delay as well. Additionally, information can be embedded on the base signal as well. Further, multiple doublet signals can be created and simultaneously combined together to form an alternate composite transmit signal.

Referring to FIGS. 1 and 3, impinging phenomenon from the environment, such as the electromagnetic or acoustic variations, is converted by a transduction system 34 into a signal appropriate for processing. Next, the received signal is processed by signal conditioning system 36 using operations well known to those of ordinary skill in the art, such as amplification, frequency conversion, filtering, equalization, and/or clipping. Once the received signal has been conditioned, A/D converters 38 and 40 sample the conditioned signal at two (or more) different sample rates. The ratio of these sample rates is the hypothesized time-scale parameter applied by the transmission system 12(1). The sample clock rates for the A/D converters 38 and 40 are controlled by the two (or more) numerically controlled oscillators 42 and 44, allowing the application of arbitrary time-scales. Next, one of the two sampled and relative time scaled signals is transferred to a shift register 46 which realizes the relative time-delay offset between the two signal paths. The two signal paths from the sampling device 38 and the shift register 46 are then combined through point-by-point multiplication in a multiplier 48. The results of this multiplication are integrated together or added for a low pass filtering operation 50 and a processed signal is output. This output signal may be further processed, interpreted and displayed to extract the specific desired information, such as a message or image data. Additionally, the estimated time-delay and time-scale offsets may be utilized to recover information embedded on the base signal with traditional modulation techniques.

Figure 4:
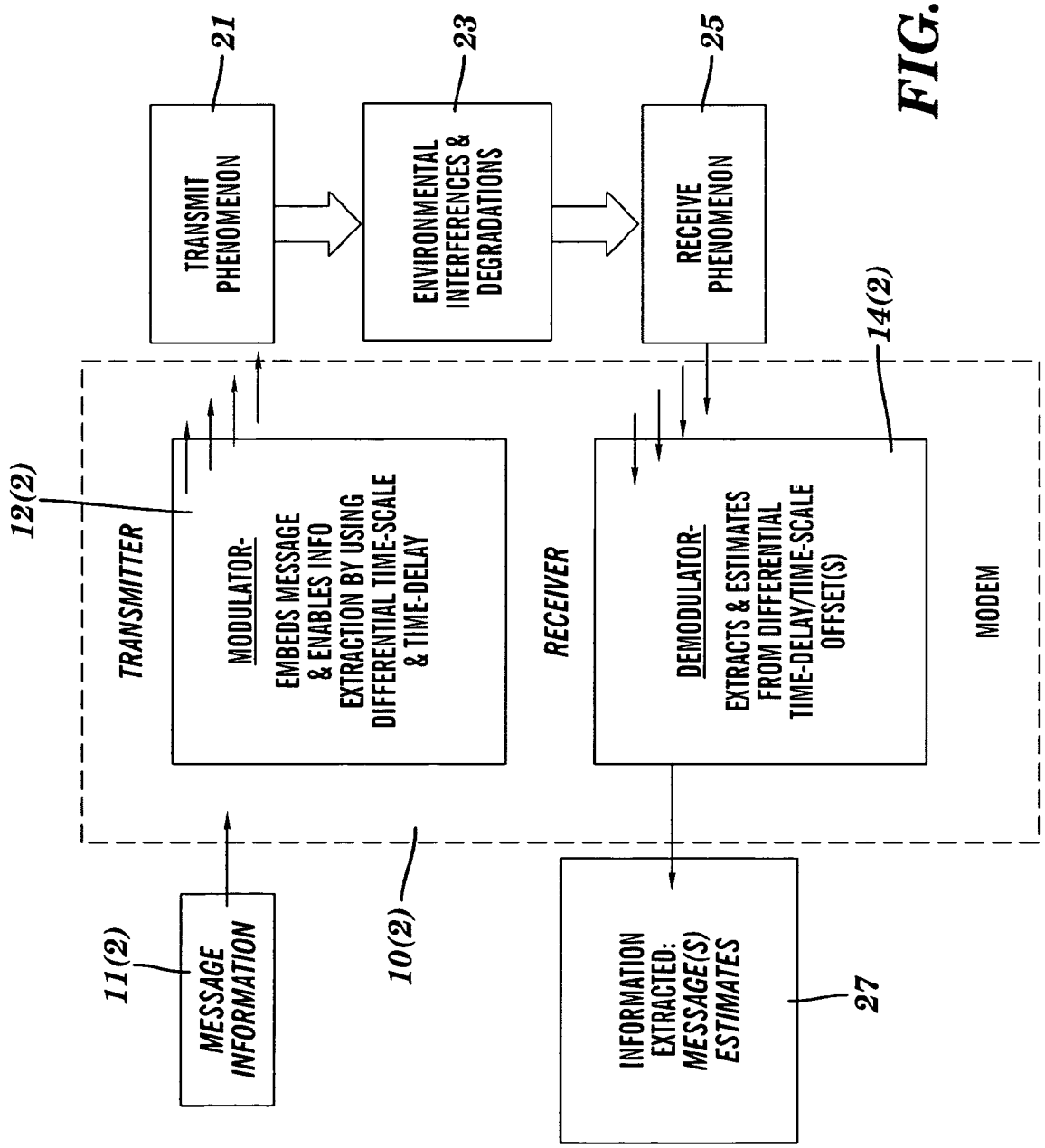
FIG. 4 is a partial block diagram and partial flow chart of a communication system in accordance with another embodiment of the present invention.
Figure 5:
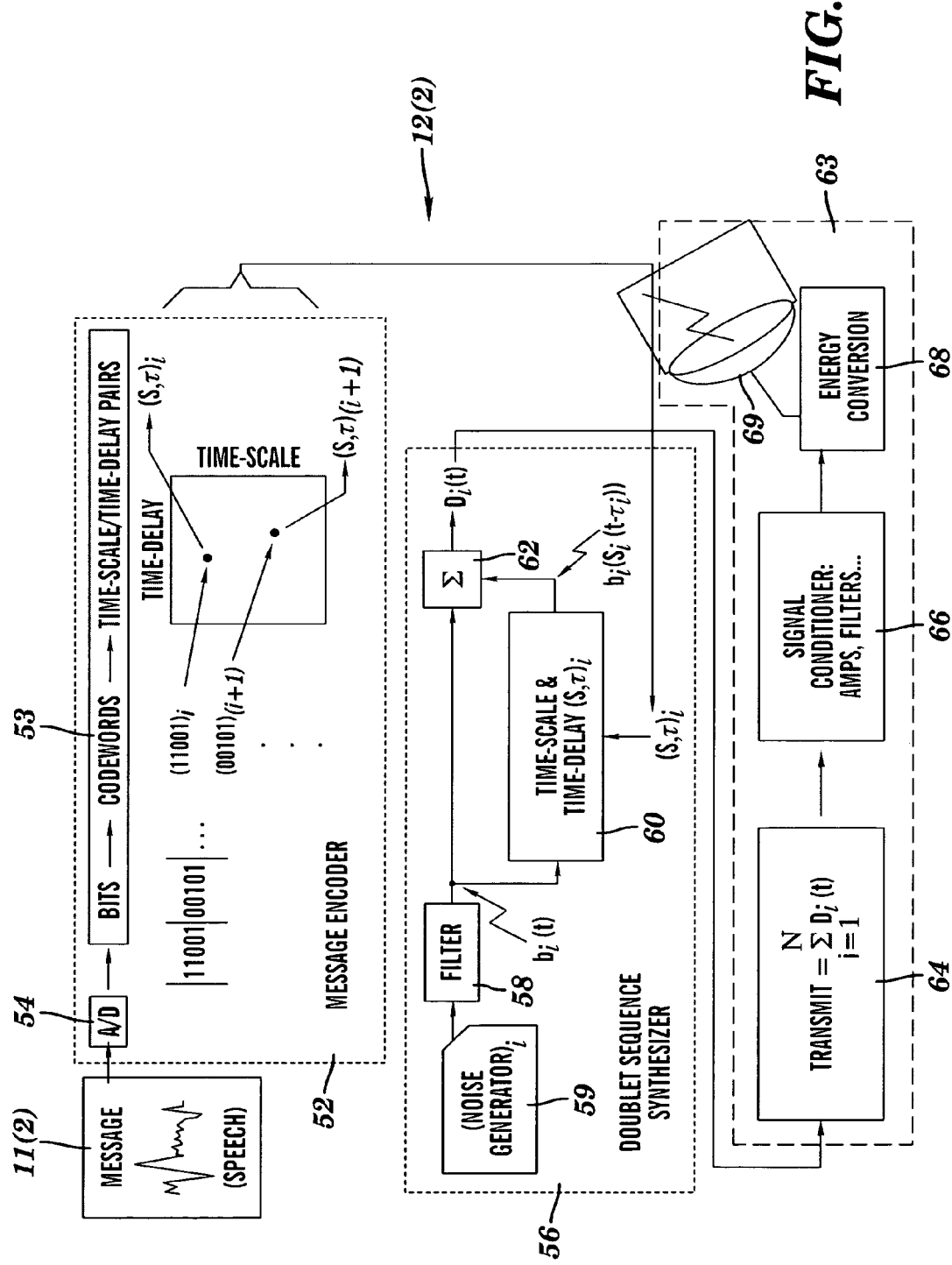
FIG. 5 is a partial block diagram and partial flow chart of one embodiment of a transmission system for the system shown in FIG. 4.
Figure 6:
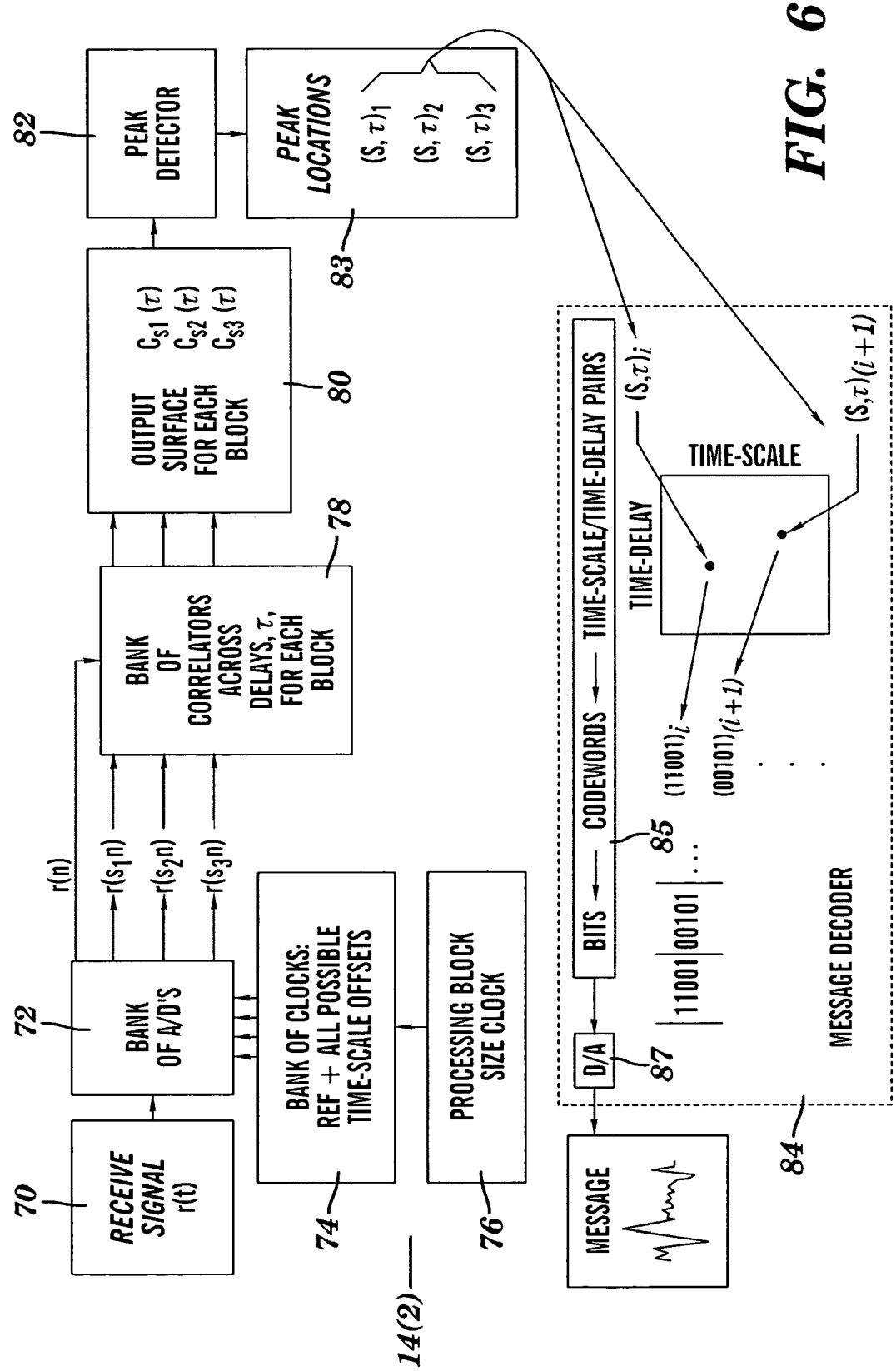
FIG. 6 is a partial block diagram and partial flow chart of one embodiment of a receiving system for the system shown in FIG. 4.

Referring to FIGS. 4-6, a communications system 10(2) for transferring message information 11(2) by modulating the relative time-delay and time-scale offsets between a pair of substantially matched base signals in accordance with another embodiment of the present invention is illustrated. In this particular embodiment, the communications system includes a modulator or transmission system 12(2) and a demodulator or receiving system 14(2).

Referring to FIGS. 4-5, one embodiment of the modulator or transmission system 12(2) for the communications system 10(2) is illustrated. In this particular embodiment, the modulator 12(2) includes a message encoder 52, a doublet sequence synthesizer 56, and a transmission system 63, although the modulator 12(2) could be comprised of other systems and components. Additionally, information could be modulated onto each base signal although the present embodiment only modulates information onto the relative time-delay and time-scale offset.

A source of message information 11(2) is coupled to the message encoder 52. A variety of different sources of message information can be used, such as a message information entered by an operator via keyboard, retrieved from a memory device, or simply a speech signal from a microphone.

The message encoder 52 includes an A/D converter 54 which samples the message information 11(2), although other types of sampling devices can be used. A clock or oscillator (not shown) is used to control the rate of sampling which should be sufficiently fast enough to accurately represent the message information. In this particular embodiment, a processing system 53 is coupled to the A/D converter 54 and generates a sequence of digital words from the sampled message information, segments this digital sequence into blocks of a specified size, and maps each block of bits to a specific time delay and time-scale offset pair by using a code-book stored in memory, although other types of processing systems carrying out other steps to select the specific time delay and time-scale offset pair can be used. A variety of different systems can be used for the processing system 53, such as computer with a central processing unit coupled to a memory programmed to carry out the steps described above.

The doublet sequence synthesizer. 56 is coupled to the message encoder 52. For each specific time-delay and time-scale offset pair a single doublet is synthesized. In this particular embodiment, the doublet sequence synthesizer 56 includes a signal generator 59, an optional filter 58, a time-scale and time-delay system 60, and a adder 62. To generate the pair of relatively offset base signals, the signal generator 59 generates an arbitrary, high time-bandwidth product signal (noise-like signal) that is also referred to as the "base signal." The filter 58 is coupled to the signal generator 59 and the time-scale and time-delay system 60 is coupled to the filter 58 and relatively time-scale and time-delays one of the pair of substantially matching base signals. A variety of different types of systems can be used to time-scale and time-delay the pair of base signal, such as the time-scale and time-delay system disclosed in FIG. 2. An adder 62 is coupled to the signal paths from the filter 58 and the time-scale and time-delay system 60 and combines the signals on these paths. Although in this particular embodiment, an adder 62 is used, other types of combiners, such as a subtractor can be used.

The transmission system 63 is coupled to message encoder 56. In this particular embodiment, the doublet waveform output of the adder 62 is coupled to the doublet overlay 64. The doublet overlay 64 creates a composite signal by adding multiple doublets together for simultaneous (overlay) transmission. By simultaneously transmitting multiple doublets, the information transfer rate can be increased. The doublet overlay 64 is coupled to a signal conditioner 66 which converts the signal into a form suitable for transmission using operations well known to those of ordinary skill in the art, such as amplifying, filtering, equalizing, and/or clipping. The signal conditioner 66 is coupled to an energy conversion device 68 which is coupled to a transduction system 69, such as an antenna or other transduction element. The transduction system 69 may have a multitude of transmit transduction elements if needed or desired. Since other components of a modulator along with their interconnections and operations are well known to those of ordinary skill in the art they will not be discussed here.

If multiple transduction elements are needed or desired, they can be configured to encode spatial information. To encode angular information the baseline distance between the two transduction elements must be fixed and known. Then, the base signal is emitted from one element while the second element emits the time-delayed/time-scaled base signal. Thus, the doublet is formed in space by the combination of these two relatively offset base signals. However, the time-delay offset between the two versions of the base signal is dependent upon the angle relative to the baseline between the two sensors. The relative time delay is the smallest for an angle broadside to the baseline of the sensors, while the largest relative time delay offset is created at an endfire of the two element array, or ninety degrees away from the broadside angle. Thus, if the relative delay can be estimated in the observed signal, the angle relative to the baseline of the array can also be estimated. So, angular information is encoded onto the signal structure simply by emitting the two offset versions of the base signals at spatially separated transduction elements.

For multiple sensor elements that receive the signal, their output signals can simply be analog summed together. The sensor elements do not require phase matching or precision linear amplifiers. Each sensor element is assumed to receive a modified version of the transmitted doublet signal. Additionally, each sensor element signal may be time delayed in the reception of the modified doublet relative to the other; thus, each of the sensed signals has the exact same features as a doublet that arrives via a multi-path (impedance mismatched, amplitude mismatched, time delays, possibly frequency dispersed, etc.). Therefore, since the robust processor combines the multi-path energy together, the robust processor will also combine the energy from the multiple sensor signals together. Random arrays of sensor elements within a local array can simply be summed together and the robust processor will combine this energy without any beamforming or other angular processing.

Interfering signals that are also summed across a random array of sensors will experience incoherent summation and will have varying responses over time, space and angle when they are simply summed together. Thus, angular discrimination at the receiving system is achievable with both good angular performance and extremely simple processing.

Referring to FIGS. 4 and 6, one embodiment of the demodulator or receiving system 14(2) for the communications system 10(2) is illustrated. In this particular embodiment, the receiving system 14(2) includes a transduction system 70, a bank of A/D converters 72, a bank of clocks 74, a processing block size clock 76, a delay and correlation system 78, and 80, a peak detector 82 and 83, and a message decoder 84, although the demodulator 14(2) could be comprised of other systems and components.

The transduction system 70 comprises one or more transduction elements, such as an antenna or antennas, that transduce the propagating energy from any impinging phenomenon, such as electromagnetic or optical, and outputs a received signal, r(t). In this particular embodiment, a bank of A/D converters 72 are coupled to the transduction system 70 to sample the received signal, r(t), at a multitude of sampling rates, although other types of sampling devices or systems could be used. To realize a time reference for each sampler/clock, the block size clock 74 provides a time "edge" where all samplers begin sampling (defines a processing block). The time reference for each sample clock is set to zero at the beginning edge of each block size clock 74. A processing block size clock 74 is coupled to a bank of sampling clocks 74. In this particular embodiment, the bank of clocks 74 are numerically controlled oscillators, although other types of clocks could be used. A delay and correlation system 78 and 80 is coupled to the bank of A/D converters 72 and realizes the time-delay and multiply/add operations for each pair of sampler outputs; thus the relatively offset sample rates realize the time-scale offset and the correlators realize the time-delay offset. The peak detector 82 and 83 is coupled to the output of the correlator 78 and 80 and estimates the time-delay and time-scale offsets with the highest energy responses.

In this particular embodiment, the message decoder 84 is coupled to the output of the peak detector 82 and 83. The message decoder 84 includes a translator system 85 coupled to the peak detector 82 and 83 which maps the estimated time-delay and time-scale offset pair to a code word and then converts that code word into bits, although other types of processing systems carrying out other steps to identify the specific time delay and time-scale parameter pair used and translate that selected pair can be used. A variety of different systems can be used for the processing system 84, such as computer with a central processing unit coupled to a memory programmed to carry out the steps described above. A D/A converter 87 is coupled to the processing system 85 to estimate the embedded information. Since other components of a demodulator along with their interconnections and operations are well known to those of ordinary skill in the art they will not be discussed here.

The operation of the communication system 10(2) in accordance with one embodiment of the present invention will be discussed with reference to FIGS. 4-6. Referring to FIGS. 4 and 5, in this particular embodiment message information 11(2) is sampled by an A/D converter 54. The sampled signal is sent to the processing system 53 which segments this sequence into blocks of a specified size, and then maps each block of bits to a specific time delay and time-scale parameter pair by using a code-book. Each time delay and time-scale parameter pair is fed to the doublet sequence synthesizer 56 that filters the pair of signals with a filter 58, time-scale and time-delays one of the pair of signals with a system 60, and then combines the pair of signals with a combiner 62, such as an adder into a doublet signal. Multiple doublet sequences can be overlapped in time and added together. The composite set of doublet signals is sent to a transmission system 69 which transforms the signal to a form suitable for transmission, with signal conditioner 66 using operations well known to those of ordinary skill in the art, such as amplifying, filtering, equalizing, and/or clipping. Next, the conditioned signal is converted to an appropriate energy form for transmission by system 68 and then is transmitted into the environment by transduction system 69.

Referring to FIGS. 4 and 6, propagating energy in the environment, in such forms as electromagnetic or optical variations, is received by the transduction system 70 and transduced into a received signal, r(t). The received signal r(t) is sampled with a bank of A/D converters 72 that are clocked at different sample rates. The bank of clocks 74 create clock sequences that are offset in rate by the desired/specified time-scales For each cycle of the processing block size clock 76 the reference time for the bank of sample clocks 74 is reset to zero. The resetting assures that the delay-offset has a specific time reference. In this particular embodiment, the received signal r(t) is sampled using each possible time scale that could have been applied by transmission system 12(2).

The sampled outputs from the A/D converters 72 comprise a non-offset reference signal, r(n), and the multiple time-scale offset signals $r(s_i,n_i)$ to $r(s_n,n_n)$ that were sampled at different rates. Next, each possible time-delay that could have been applied by the transmission system 12(2) is applied to each of the multiple time-scale offset signals, $r(s_i,n_i)$ to $r(s_n,n_n)$, from the bank of A/D converters 72 and the resulting signals are each correlated against the non-offset reference signal, r(n) in the delay and correlation system 78 and 80. The peak detector 82 and 83 estimate the time-delay and time-scale offset locations of the highest energy responses in each of these processed signals.

The time-delay and time-scale parameter pairs corresponding to the peaks locations are extracted and passed to the message decoder 84 which maps the time-delay and time-scale parameter pairs back into the message information. In this particular embodiment, the translation system 85 maps the time-delay and time-scale pair applied to a code word and then converts that code word into bits, although other types of processing systems carrying out other steps to identify the specific time delay and time-scale parameter pair used and translate that selected pair can be used. The bits can be converted by a D/A converter 87 to an analog signal which is output as the message information.

This method of communications provides robust performance in adverse environments, with degradation such as multipaths, frequency dispersion, time-varying channels, poorly matched electronics, and over-resolved channels/scatterers. Additionally, it provides a method to easily and efficiently, coherently combine the received signals at multiple receivers that are spatially separated and potentially poorly matched.

Although in this particular embodiment, one type of modulator for electrical signals is used, other types of modulators for other forms of signals can also be used, such as an optical modulator that modulates a laser/light source. These offset signals are transmitted optically and the transmitted doublet signal propagates through an optical fiber and associated components. The receiving system/demodulator in this example processes the optical signal to estimate the embedded time delay and time-scale offsets and extract/reconstruct the message information.

Figure 7:
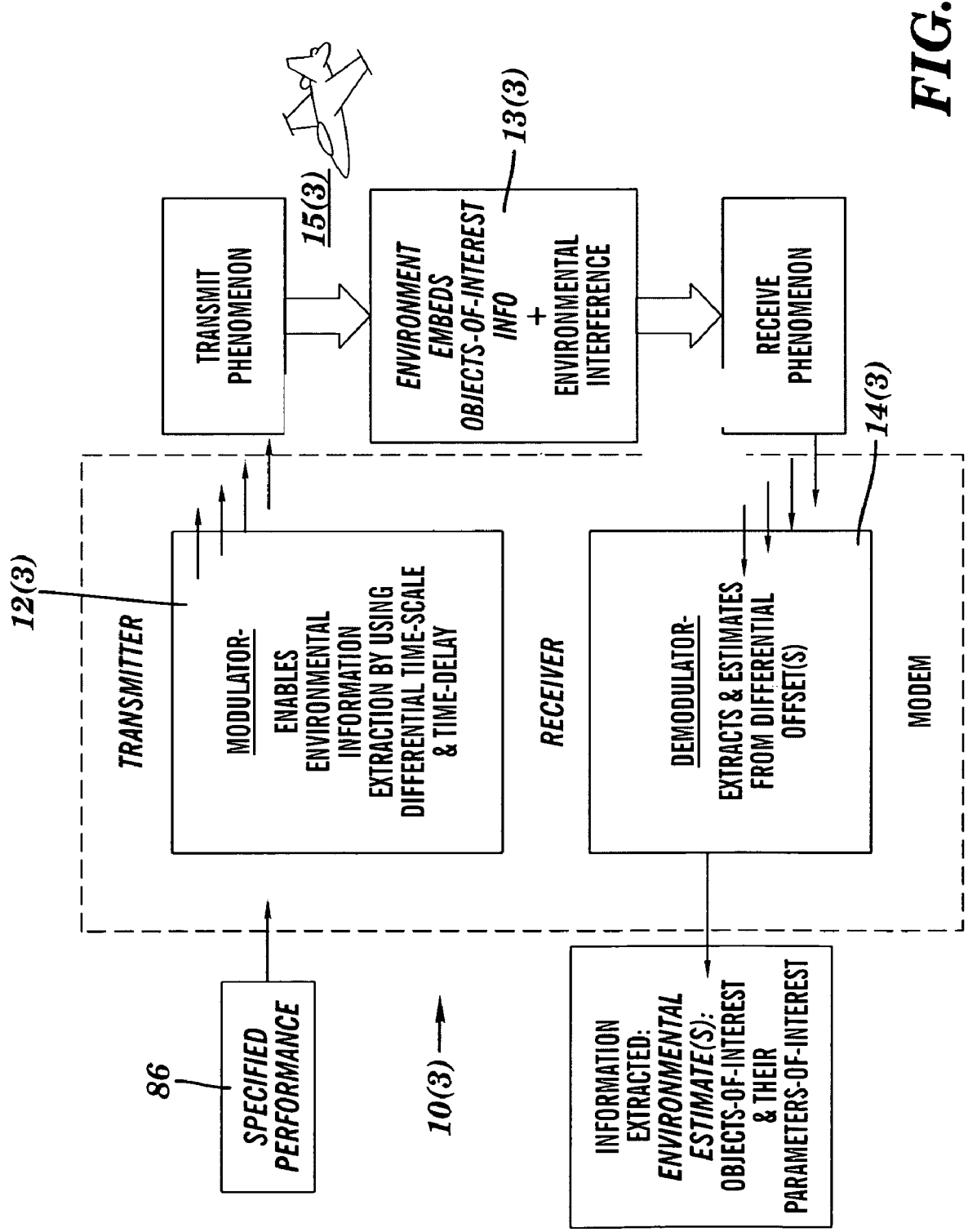
FIG. 7 is a partial block diagram and partial flow chart of an imaging system in accordance with another embodiment of the present invention.
Figure 8:
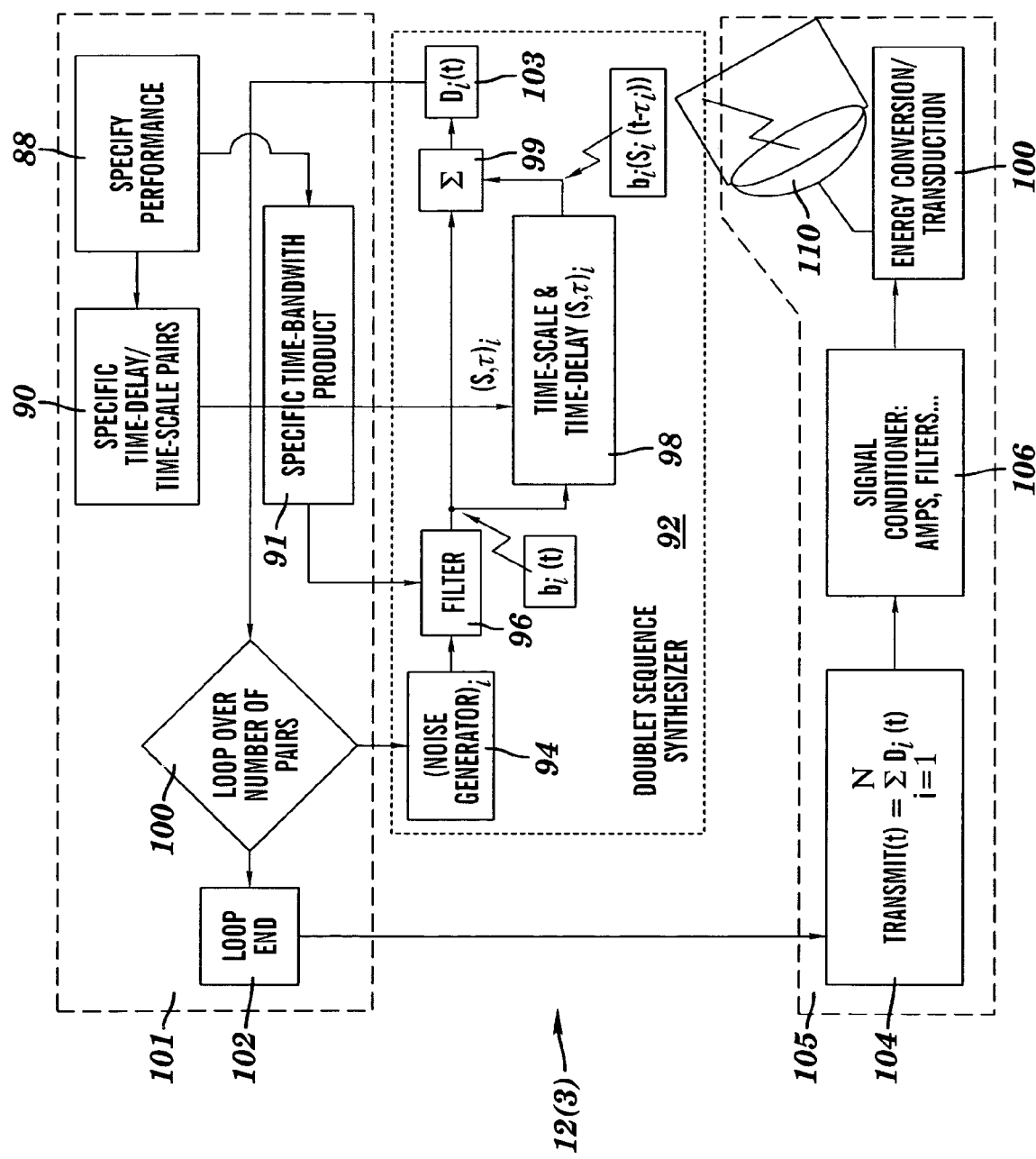
FIG. 8 is a partial block diagram and partial flow chart of one embodiment of a transmission system for the system shown in FIG. 7.
Figure 9:
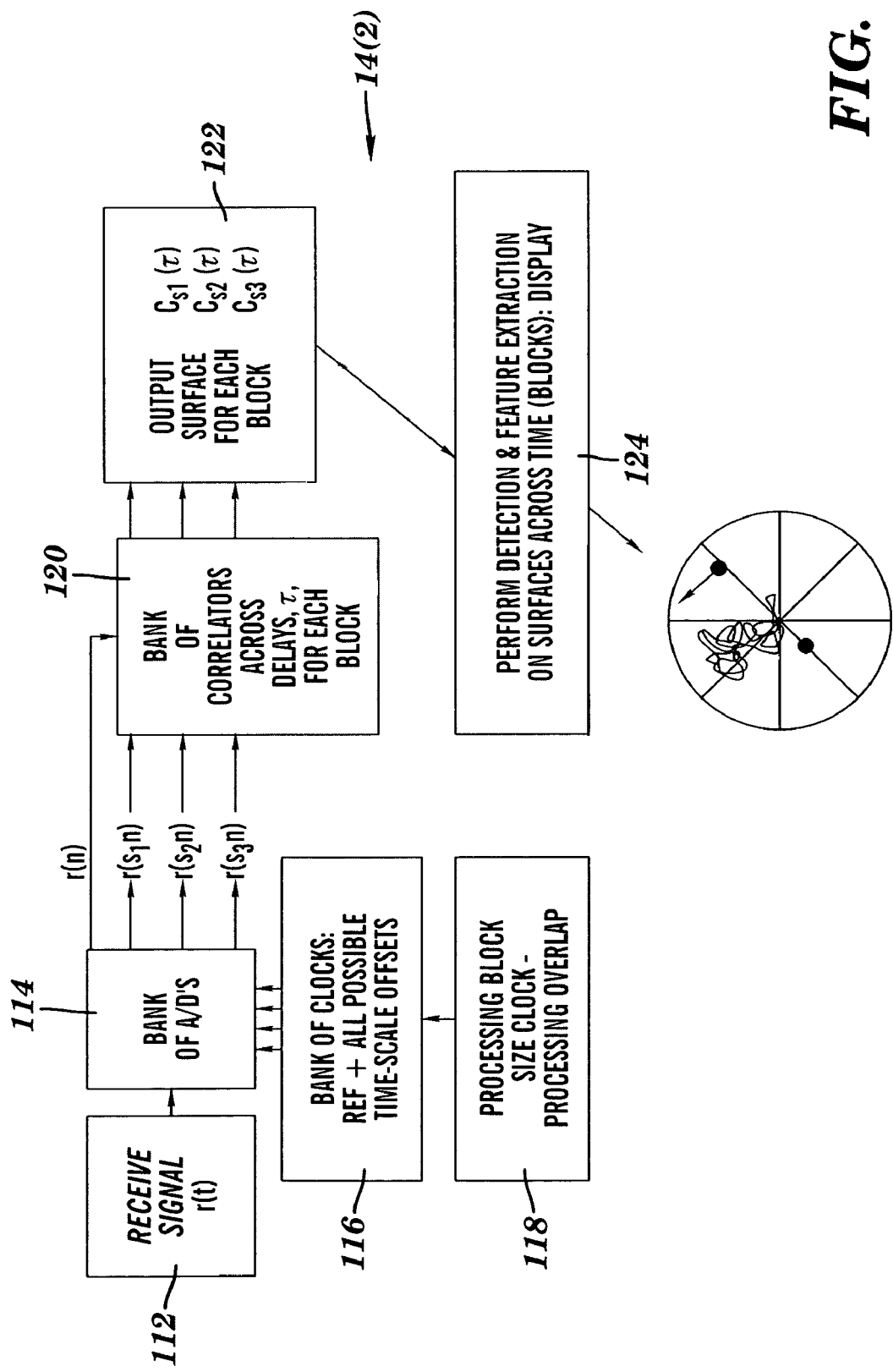
FIG. 9 is a partial block diagram and partial flow chart of one embodiment of a receiving system for the system shown in FIG. 7.

Referring to FIGS. 7-9, an imaging system 10(3) for extracting imaging information from an environment or medium by modulating the time-delay and time-scale offsets between a pair or pairs of substantially matched base signals is illustrated. In this particular embodiment, the imaging system 10(3) includes a modulator or transmission system 12(3) and a demodulator or receiving system 14(3).

Referring to FIGS. 7 and 8, one embodiment of the modulator or transmission system 12(3) for the imaging system 10(3) is illustrated. In this particular embodiment, the modulator 12(3) includes a processing system 101 which receives and/or retrieves a specified performance 88, such as angular, range and/or speed resolution requirements for a radar or other imaging application, and then in response to the specified performance selects a specific time bandwidth product 91 and specific set of time-delay and time-scale pairs 90 to carry out the specified performance 88. The processing system 101 may need to loop 100 and 102 through multiple of pairs of time-scales and time-delays. A variety of different types of systems or devices can be used for the processing system 101, such as computer with a central processing unit (not shown) coupled to a memory (not shown) which is programmed to carry out the steps described above. The processing system 101 may include an input device (not shown), such as a keyboard, or a memory device from which a specified performance 88 is input or retrieved.

A doublet sequence synthesizer 92 is coupled to the processing system 101 and includes a signal generator 94, a filter 96, a time-scale and time-delay system 98, and an adder 99. The signal generator 94 is coupled to the processing system to receive the specified time-bandwidth product 91 and the loop identification 100 and creates a new high time-bandwidth product signal or independent "base signal," b(t), for each loop. The filter 96 is coupled to signal generator 94 to properly shape the frequency content of the generated signal. A time-scale and time-delay system 98 is coupled to the filter 96 and time-scales and time-delays one of the pair of substantially matching base signals. A variety of different types of systems can be used to time-scale and time-delay the pair of base signal, such as the time-scale and time-delay system disclosed in FIG. 2. However, since these signals are known analytically, a computer can easily and efficiently create time-scaled replicas. An adder 99 is coupled to the signal paths from the filter 96 and the time-scale and time-delay system 98 and combines these multiple signal paths to form a doublet signal, $D(_t)$, 103. Although in this particular embodiment, an adder 99 is used, other types of combiners, such as a subtractor can be used.

A transmission system 105 is coupled to processing system 101 which is coupled to the output of the doublet sequence synthesizer 92. In this particular embodiment, an output of the processing system 101 is coupled to the doublet overlay adder 104 that combines the multiple doublets for simultaneous transmission. The doublet overlay adder 104 is coupled to a signal conditioner 106 which converts the signal into a form suitable for transmission using operations well known to those of ordinary skill in the art, such as amplifying, filtering, equalizing, and/or clipping. The signal conditioner 106 is coupled to an energy conversion device 108 which is coupled to a transduction system 110, such as an antenna or other transduction element. The transduction system 110 may have a multitude of transmit transduction elements if needed or desired. Since other components of a modulator along with their interconnections and operations are well known to those of ordinary skill in the art they will not be discussed here.

Referring to FIGS. 7 and 9, one embodiment of the demodulator or receiving system 14(3) for the imaging system 10(3) is illustrated. In this particular embodiment, the demodulator 14(3) includes a transduction system 112, a bank of A/D converters 114, a bank of clocks 116, a processing block size clock 118, a delay and correlation system 120 and 122, and a feature processing system 124, although the demodulator 14(3) could be comprised of other systems and components.

The transduction system 112 comprises one or more transduction elements such as an antenna or antennas, that transduce the propagating energy from any impinging phenomenon, such as electromagnetic or optical variations, and outputs a received signal, r(t). In this particular embodiment, a bank of A/D converters 114 are coupled to the transduction system 112 to sample the received signal r(t), although other types of sampling devices or systems could be used. A processing block size clock 118 periodical resets the reference time on the bank of clocks 116. In this particular embodiment, the bank of clocks 116 are numerically controlled oscillators, although other types of clocks could be used. The ratio of clock rages are the hypothesized time-scale offsets. A delay and correlation system 120 and 122 is coupled to the bank of A/D converters 114 and applies the relative time-delay offsets to each of the time-scaled sampler outputs and correlates each of the time-delayed and time-scaled signals, $r(s_l,n_l)$-$r(s_n,n_n)$, with the non-offset reference signal r(n). The feature processing system 124 is coupled to the device 122 which performs detection and feature extraction on surfaces across time. A variety of different types of systems or devices can be used for the feature processing system 124, such as computer with a central processing unit (not shown) coupled to a memory (not shown) which is programmed to carry out feature extraction or image estimates based on the correlations. Since other components of a demodulator along with their interconnections and operations are well known to those of ordinary skill in the art they will not be discussed here.

The operation of the imaging system 10(3) in accordance with one embodiment of the present invention will be discussed with reference to FIGS. 7-9. Referring to FIGS. 7 and 8, in this particular embodiment the specified performance 88 is provided to the processing system 101 by, for example an input device, such as a keyboard, or is retrieved from a memory device. The specified performance dictates the set of time-delay and time-scale pairs 90 and the specific time-bandwidth product 91 for each base signal to be generated. The set of time delay and time-scale pairs and the time-bandwidth product, controls the performance properties of the imaging system 10(3). By specifying this combination of values, the range, angle and velocity resolution are specified as well as the interval over which the multiple reflected signal paths are combined. The loop 100 and 102 accepts the time delay and time-scale parameter pairs and loops over the number of pairs. For each loop 100 and 102 it passes a time-delay and time-scale parameter pair to the doublet sequence synthesizer 92.

The doublet sequence synthesizer 92 accepts a time-delay and time-scale pair and a specified time-bandwidth product from processing system 101. The signal generator 94 creates a new high time-bandwidth product "base signal," b(t), for each loop. The base signal from the signal generator 94 is filtered by a filter 96 to shape its frequency content. The time-scale and time-delay system 98 time-scales and time-delays one of the pair of base signals and then an adder 99 combines the pair of signals to form a doublet signal 103, D(t). The loop is repeated to create multiple independent doublet signals and finally the loop ends 102 and all of the doublet signals are coupled to the transmission system 105 and are added by the doublet overlay adder 104 to create the transmit signal. The transmission system 105 transforms the signal to a form suitable for transmission, with signal conditioner 106 using operations well known to those of ordinary skill in the art, such as amplifying, filtering, equalizing, and/or clipping. Next, the conditioned signal is converted to an appropriate energy form for transmission by system 108 and then is transmitted into a medium or environment that may possess information of interest by the transduction system 110.

Referring to FIGS. 7 and 9, propagating energy in the environment, such as electromagnetic and optical variations, is received by the transduction system 112 and transduced into a received signal, r(t). The received signal r(t) is sampled with a bank of A/D converters 114 that are clocked at different sample rates applied by transmission system 12(3). The bank of clocks 116 create clock sequences that are offset in rate by the desired/specified time-scales. For each cycle of the processing block size clock 118 the reference time for the bank of sample clocks 74 is reset to zero. The resetting assures that the delay-offset has a specific time reference.

The sampled outputs from the A/D converters 114 comprise a non-offset reference signal, r(n), and the multiple time-scale offset signals $r(s_l,n_l)$ to $r(s_n,n_n)$ that were sampled at different rates. Next, time-delays applied by the transmission system 12(3) are applied to each of the multiple time-scale offset signals $r(s_l,n_l)$ to $r(s_n,n_n)$ from the bank of A/D converters 114 and the resulting signals are each correlated with the non-offset reference signal, r(n) in the delay and correlation system 120 and 122. The feature processing system 124 extracts the desired information that may include detection, localization, kinematics, and identities based on the correlations. Energy detection or envelope detection of the correlator output can be realized with peak detection over the correlator output surface (across time-delay and time-scale). These detected peaks can map to physical locations and physical properties of the emitters and/or reflectors.

The performance of this imaging system 10(3) can be specified and controlled according to the aforementioned specified performance. The robustness to degradations introduced by: low cost components in the modulator/demodulator; multipath propagation, target over-resolution; and rapid time-variability can all be simultaneously achieved with the present invention. This imaging system 10(3) does not require demanding processing, precision synchronization, highly linear components, or precision placement and matching across multiple transmit and/or receive elements. The present invention solves the problem of simultaneously realizing a radar with a specified performance and lower cost implementation, high efficiency, signal security, and extreme robustness in estimating the environmental scattering.

In addition to the applications discussed above, the present invention can also be used in a variety of different applications. For example, the present invention can be used in a navigation system and in an identification ("ID") or a identification-friend-or-foe ("IFF") system.

In summary, with the present invention information extraction from active sensing systems, such as radar, sonar, navigation systems, ultrasonic imagers, and tomographic imagers, is enhanced and the robustness, reliability, and synchronization of communications systems, such as wireless, acoustic, fiber optic, laser, and wire-line are also enhanced. Additionally, for all of these applications while enhancing performance the present invention is able to lower the cost of equipment for these systems when compared to prior systems. Further, the present invention enables the simultaneous accomplishment of both the active sensing goal and the communications goal with the same assets and even the same transmitted energy which delivers additional efficiencies for multi-use applications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A modulator/demodulator system comprising:
    a transmission system with a time scale and time delay encoding system which applies one of a plurality of time scales and one of a plurality of time delays to one of a pair of matching base signals to encode information, the transmission system combines the time scaled and time delayed base signal with the other one of the pair of base signals to form a doublet, and transmits the doublet, wherein the applied one of the plurality of time scales is less than one; and
    a receiving system which receives the doublet and extracts information from between the time scaled and time delayed base signal and the other one of the pair of base signals based on the one of the plurality of time scales and the one of the plurality of time delays which were applied.

2. The system as set forth in claim 1 wherein the transmission system further comprises:
    a signal generator which generates the pair of matching base signals;
    the encoding system modulates the one of the plurality of time scales and the one of the plurality of time delays onto the one of the pair of matching base signals;
    a combiner which combines the time scaled and time delayed base signal with the other one of the pair of base signals to form the doublet; and
    a transmitter which transmits the doublet.

3. The system as set forth in claim 1 wherein the transmission system has a plurality of doublets with an independent one of a plurality of the time scales and independent one of the plurality of time delays applied to each of the doublets, the transmission system combines all of the doublets to form and transmit a composite signal; and
    wherein the receiving system receives the composite signal and extracts the information from each of the doublets that comprise the composite signal based on the respective one of the plurality of time scale and the one of the plurality of time delay that were applied to each of the doublets.

4. A modulator/demodulator system comprising:
    a transmission system with a time scale and time delay encoding system which applies one of a plurality of time scales and one of a plurality of time delays to one of a pair of matching base signals to encode information, wherein the applied one of the plurality of time scales is less than one, wherein the transmission system further comprises a pair of synchronized and spatially separated radiating elements, one radiating element radiates one of the matching base signals and the other radiating element radiates the time scaled and time delayed base signal wherein the one of the matching base signals and the time scaled and the time delayed base signal combine during the radiation to form a doublet; and
    a receiving system which receives the doublet and extracts information from between the time scaled and time delayed base signal and the other one of the pair of base signals based on the one of the plurality of time scales and the one of the plurality of time delays which were applied.

5. The system as set forth in claim 1 wherein the at least one of the pair of matching base signals contains the information and the receiving system extracts the information from the at least one of the pair of matching base signals in the doublet.

6. The system as set forth in claim 2 wherein the combiner is an adder or a subtractor.

7. The system as set forth in claim 1 wherein the transmission system further comprises:
    a temporal equalizer which substantially assures that signal energy of the pair of matching base signals is evenly distributed across the duration of the pair of matching base signal; and
    a spectral equalizer which substantially assures that the signal energy is evenly distributed across the spectrum of the pair of matching base signals.

8. The system as set forth in claim 1 wherein the information comprises a message embedded by the transmission system.

9. The system as set forth in claim 1 wherein the information comprises imaging data embedded by an environment in which the doublet was transmitted.

10. The system as set forth in claim 1 wherein the receiving system further comprises:
    a segmentation device that receives the doublet and forms received segments from the received doublet;
    a time scaling device which applies at least one of the plurality of time scales to each of the received segments to form time scaled signal segments;
    a time delaying device which applies at least one of the plurality of time delays to each of the received segments to form time delayed signal segments;
    a multiplier which multiplies each of the time scaled signal segments with each of the time delayed signal segments to form multiplied signals;

an integrator which integrates the multiplied signals across time to form detection signals; and a processing system which compares the detection signals at different ones of the plurality of time scales and different ones of the plurality of time delays over time to determine the applied one of the plurality of time scales and the applied one of the plurality of time delays to extract the information from the detection signal.

11. The system as set forth in claim 10 wherein the receiving system further comprises:

a temporal equalizer which substantially assures that signal energy of the pair of matching base signals is evenly distributed across the duration of the pair of matching base signals; and a spectral equalizer which substantially assures that the signal energy is evenly distributed across the spectrum of the pair of matching base signals.

12. A modulation/demodulation method comprising:

applying one of a plurality of time scales and one of a plurality of time delays to one of a pair of matching base signals to encode information, wherein the applied one of the plurality of time scales is less than one;

combining the time scaled and time delayed base signal with the other one of the pair of base signals to form a doublet;

transmitting the doublet into the environment; receiving the doublet; and extracting information from between the time scaled and time delayed base signal and the other one of the pair of base signals based on the one of the plurality of time scales and on the one of the plurality of time delays which were applied.

13. A modulation/demodulation method comprising:

applying one of a plurality of time scales and one of a plurality of time delays to one of a pair of matching base signals to encode information, wherein the applied one of the plurality of time scales is less than one;

radiating one of the matching base signals from one of a pair of synchronized and spatially separated radiating elements;

radiating the time scaled and time delayed base signal from another one of the pair of synchronized and spatially separated radiating elements, wherein the radiated time scaled and time delayed base signal with the other one of the pair of base signals combine during the radiation to form a doublet; receiving the doublet; and extracting information from between the time scaled and time delayed base signal and the other one of the pair of base signals based on the one of the plurality of time scales and on the one of the plurality of time delays which were applied.

14. The method as set forth in claim 12 further comprising providing a plurality of doublets with each of the doublets having an independent one of the plurality of time scales and an independent one of the plurality of time delays applied to each of the doublets, combining all of the doublets to form a composite signal transmitting the composite signal into the environment, receiving the composite signal, and extracting the information from the doublets that comprise the composite signal based on the respective one of the plurality of time scales and one of the plurality of time delays which were applied to each of the doublets.

15. The method as set forth in claim 12 further comprising imbedding information in one of the pair of matching base signals in the doublet.

16. The method as set forth in claim 12 wherein the combining comprises adding or subtracting the time scaled and time delayed base signal with the other one of the pair of base signals to form the doublet.

17. The method as set forth in claim 12 further comprising:

substantially assuring that signal energy of the pair of matching base signals is evenly distributed across the duration of the pair of matching base signals prior to the transmitting; and substantially assuring that the signal energy is evenly distributed across the spectrum of the pair of matching base signals prior to the transmitting.

18. The method as set forth in claim 12 wherein the information comprises a message embedded prior to the transmission of the doublet.

19. The method as set forth in claim 12 wherein the information comprises imaging data embedded by an environment in which the doublet was transmitted.

20. The method as set forth in claim 12 wherein the receiving further comprises:

segmenting the received doublet to form received segments;

applying at least one of the plurality of time scales to each of the received segments to form time scaled signal segments;

applying at least one of the plurality of time delays to each of the received segments to form time delayed signal segments;

multiplying each of the time scaled signal segments with each of the time delayed signal segments to form multiplied signals;

integrating the multiplied signals across time to form detection signals; and processing the detection signals at different ones of the plurality of time scales and different ones of the plurality of time delays over time to determine the applied one of the plurality of time scales and the applied one of the plurality of time delays to extract the information from the determined detection signal.

21. The method as set forth in claim 20 further comprising:

substantially assuring that signal energy of the pair of matching base signals is evenly distributed across the duration of the pair of matching base signals following the receiving; and substantially assuring that the signal energy is evenly distributed across the spectrum of the pair of matching base signals following the receiving.

22. A receiver system for receiving transmitted information comprising:

a receiver which receives a doublet, the doublet comprises at least two matching base signals where one of a plurality of time scales and one of a plurality of time delays are applied to at least one of the base signals to encode information before being combined with the other base signal; and a processing system which extracts the information from between the time scaled and time delayed base signal and the other base signal which comprise the doublet based on the one of the plurality of time scales and the one of the plurality of time delays which were applied, wherein the applied one of the plurality of time scales is less than one, wherein the receiver further comprises a device that time scales a received signal from the doublet by the time scale that was applied to form a time scaled version of the received signal, a correlator that correlates the received signal with the time scaled version of the received signal to form a time delay correlation signal, a detector that detects the peaks of this time delay correlation signal, and an estimator that uses the time delay locations of the peaks to estimate the angle of arrival of each of the received signals.

23. A receiver system for receiving transmitted information comprising:
a receiver which receives a doublet, the doublet comprises at least two matching base signals where one of a plurality of time scales and one of a plurality of time delays is applied to at least one of the base signals to encode information before being combined with the other base signal; and
a processing system which extracts the information from between the time scaled and time delayed base signal and the other base signal which comprise the doublet based on the one of the plurality of time scales and the one of the plurality of time delays which were applied to the doublet prior to transmission, wherein the applied one of the plurality of time scales is less than one;
wherein the receiver receives a plurality of the doublets in a composite signal and the processing system extracts the information from the composite signal based on the one of the plurality of time scales and the one of the plurality of time delays which were applied to at least one of the base signals in each of the doublets.

24. The system as set forth in claim 22 wherein the processing system also extracts the information from the doublet based on one of a plurality of time delays which was applied to the doublet prior to transmission.

25. A receiver system for receiving transmitted information comprising:
a receiver which receives a doublet, the doublet comprises at least two matching base signals where one of a plurality of time scales and one of a plurality of time delays is applied to at least one of the base signals to encode information before being combined with the other base signal; and
a processing system which extracts the information from between the time scaled and time delayed base signal and the other base signal which comprise the doublet based on the one of the plurality of time scales and the one of the plurality of time delays which were applied to the doublet prior to transmission, wherein the applied one of the plurality of time scales is less than one;
wherein the processing system further comprises:
a segmentation device that receives the doublet and forms received segments from the received doublet;
a time scaling device which applies at least one of the plurality of time scales to each of the received segments to form time scaled signal segments;
a time delaying device which applies at least one of the plurality of time delays to each of the received segments to form time delayed signal segments;
a multiplier which multiplies each of the time scaled signal segments with each of the time delayed signal segments to form multiplied signals; and
an integrator which integrates the multiplied signals across time to form detection signals, the processing system comparing the detection signals at different ones of the plurality of time scales and different ones of the plurality of time delays over time to determine the applied one of the plurality of time scales and the applied one of the plurality of time delays to extract the information from the detection signal.

26. A receiver system for receiving transmitted information comprising:
a receiver which receives a doublet, the doublet comprises at least two matching base signals where one of a plurality of time scales and one of a plurality of time delays is applied to at least one of the base signals to encode information before being combined with the other base signal; and
a processing system which extracts the information from between the time scaled and time delayed base signal and the other base signal which comprise the doublet based on the one of the plurality of time scales and the one of the plurality of time delays which were applied, wherein the applied one of the plurality of time scales is less than one;
wherein the receiver further comprises: a temporal equalizer which substantially assures that signal energy of the matching base signals is evenly distributed across the duration of the at least two matching base signals; and
a spectral equalizer which substantially assures that the signal energy is evenly distributed across the spectrum of the at least two matching base signals.

27. A receiving method for receiving information comprising:
receiving a plurality of doublets contained in a composite signal, each of the doublets comprises at least two matching base signals where one of a plurality of time scales and one of a plurality of time delays is applied to at least one of the base signals to encode information before being combined with the other base signal; and
extracting information from the composite signal based on the one of the plurality of time scales and the one of the plurality of time delays which were applied to at least one of the base signals in each of the doublets, wherein the applied one of the plurality of time scales is less than one.

28. A receiving method for receiving information comprising:
receiving a doublet, the doublet comprises at least two matching base signals where one of a plurality of time scales and one of a plurality of time delays is applied to at least one of the base signals to encode information before being combined with the other base signal; and
extracting information from between the time scaled and time delayed base signal and the other base signal which comprise the doublet based on the one of the plurality of time scales which were applied, wherein the applied one of the plurality of time scales is less than one;
wherein the information comprises imaging data embedded by an environment in which the doublet was transmitted.

29. A receiving method for receiving information comprising:
receiving a doublet, the doublet comprises at least two matching base signals where one of a plurality of time scales and one of a plurality of time delays is applied to at least one of the base signals to encode information before being combined with the other base signal; and
extracting information from between the time scaled and time delayed base signal and the other base signal which comprise the doublet based on the one of the plurality of time scales and the one of the plurality of time delays which were applied, wherein the applied one of the plurality of time scales is less than one;
wherein the extracting further comprises: segmenting the received doublet to form received segments;

applying at least one of the plurality of time scales to each of the received segments to form time scaled signal segments;

applying at least one of the plurality of time delays to each of the received segments to form time delayed signal segments;

multiplying each of the time scaled signal segments with each of the time delayed signal segments to form multiplied signals; and integrating the multiplied signals across time to form detection signals, wherein the extracting further comprises processing the detection signals at different ones of the plurality of time scales and different ones of the plurality of time delays over time to determine the applied one of the plurality of time scales and the applied one of the plurality of time delays to extract the information from the determined detection signal.

30. A receiving method for receiving information comprising:

receiving a doublet comprising a combined pair of matching base signals where one of a plurality of time scales and one of a plurality of time delays is applied to at least one of the base signals to encode information before being combined with the other base signal;

extracting information from between the time scaled and time delayed base signal and the other base signal which comprise the doublet based on the one of the plurality of time scales and the one of the plurality of time delays which were applied, wherein the applied one of the plurality of time scales is less than one;

substantially assuring that signal energy of the pair of matching base signals is evenly distributed across the duration of the pair of matching base signals following the receiving; and substantially assuring that the signal energy is evenly distributed across the spectrum of the pair of matching base signals following the receiving.

31. A receiving method for receiving information comprising:

receiving a doublet comprising a combined matching base signals where one of a plurality of time scales and one of a plurality of time delays is applied to at least one of the base signals to encode information before being combined with the other base signal; and extracting information from between the time scaled and time delayed base signal and the other base signal based on the one of the plurality of time scales and the one of the plurality of time delays which were applied to, wherein the applied one of the plurality of time scales is less than one.

32. A communication system comprising:

a transmission system with a time scale and time delay encoding system embeds communication information by applying one of a plurality of time scales and one of a plurality of time delays to one of a pair of matching base signals, the transmission system combines the time scaled and time delayed base signal with the other one of the pair of base signals to form a doublet, and transmits the doublet, wherein the applied one of the plurality of time scales is less than one; and a receiving system which receives the doublet and extracts information from between the time scaled and time delayed base signal and the other one of the pair of base signals based on the one of the plurality of time scales and the one of the plurality of time delays which were applied.

33. The system as set forth in claim 32 wherein the transmission system further comprises:

a signal generator which generates the pair of matching base signals;

the encoding system embeds the communication information by modulating the one of the plurality of time scales and the one of the plurality of time delays onto the one of the pair of matching base signals;

a combiner which combines the time scaled and time delayed base signal with the other one of the pair of base signals to form the doublet; and a transmitter which transmits the doublet.

34. The system as set forth in claim 32 wherein the transmission system has a plurality of doublets with an independent one of a plurality of the time scales and independent one of the plurality of time delays applied to each of the doublets, the transmission system combines all of the doublets to form and transmit a composite signal; and wherein the receiving system receives the composite signal and extracts the information from each of the doublets that comprise the composite signal based on the respective one of the plurality of time scale and the one of the plurality of time delay that were applied to each of the doublets.

35. The system as set forth in claim 32 wherein the at least one of the pair of matching base signals contains additional information and the receiving system extracts the additional information from the at least one of the pair of matching base signals in the doublet with the additional information.

36. The system as set forth in claim 33 wherein the combiner is an adder or a subtractor.

37. The system as set forth in claim 32 wherein the transmission system further comprises:

a temporal equalizer which substantially assures that signal energy of the pair of matching base signals is evenly distributed across the duration of the pair of matching base signal; and a spectral equalizer which substantially assures that the signal energy is evenly distributed across the spectrum of the pair of matching base signals.

38. The system as set forth in claim 32 wherein the receiving system further comprises:

a segmentation device that receives the doublet and forms received segments from the received doublet;

a time scaling device which applies at least one of the plurality of time scales to each of the received segments to form time scaled signal segments;

a time delaying device which applies at least one of the plurality of time delays to each of the received segments to form time delayed signal segments;

a multiplier which multiplies each of the time scaled signal segments with each of the time delayed signal segments to form multiplied signals;

an integrator which integrates the multiplied signals across time to form detection signals; and a processing system which compares the detection signals at different ones of the plurality of time scales and different ones of the plurality of time delays over time to determine the applied one of the plurality of time scales and the applied one of the plurality of time delays to extract the communication information from the detection signal.

39. The system as set forth in claim 38 wherein the receiving system further comprises:
a temporal equalizer which substantially assures that signal energy of the pair of matching base signals is evenly distributed across the duration of the pair of matching base signals; and
a spectral equalizer which substantially assures that the signal energy is evenly distributed across the spectrum of the pair of matching base signals.

40. A method for communicating comprising:
applying one of a plurality of time scales and one of a plurality of time delays to one of a pair of matching base signals to embed communication information, wherein the applied one of the plurality of time scales is less than one;
combining the time scaled and time delayed base signal with the other one of the pair of base signals to form a doublet;
transmitting the doublet into the environment;
receiving the doublet; and
extracting the communication information from between the time scaled and time delayed base signal and the other one of the pair of base signals based on the one of the plurality of time scales and on the one of the plurality of time delays which were applied.

41. The method as set forth in claim 40 further comprising providing a plurality of doublets with each of the doublets having an independent one of the plurality of time scales and an independent one of the plurality of time delays applied to each of the doublets to embed the communication information, combining all of the doublets to form a composite signal, transmitting the composite signal into the environment, receiving the composite signal, and extracting the communication information from the doublets that comprise the composite signal based on the respective one of the plurality of time scales and one of the plurality of time delays which were applied to each of the doublets.

42. The method as set forth in claim 40 further comprising imbedding additional information in one of the pair of matching base signals in the doublet.

43. The method as set forth in claim 40 wherein the combining comprises adding or subtracting the time scaled and time delayed base signal with the other one of the pair of base signals to form the doublet.

44. The method as set forth in claim 40 further comprising:
substantially assuring that signal energy of the pair of matching base signals is evenly distributed across the duration of the pair of matching base signals prior to the transmitting; and
substantially assuring that the signal energy is evenly distributed across the spectrum of the pair of matching base signals prior to the transmitting.

45. The method as set forth in claim 40 wherein the receiving further comprises:
segmenting the received doublet to form received segments;
applying at least one of the plurality of time scales to each of the received segments to form time scaled signal segments;
applying at least one of the plurality of time delays to each of the received segments to form time delayed signal segments;
multiplying each of the time scaled signal segments with each of the time delayed signal segments to form multiplied signals;
integrating the multiplied signals across time to form detection signals; and
processing the detection signals at different ones of the plurality of time scales and different ones of the plurality of time delays over time to determine the applied one of the plurality of time scales and the applied one of the plurality of time delays to extract the communication information from the determined detection signal.

46. The method as set forth in claim 45 further comprising:
substantially assuring that signal energy of the pair of matching base signals is evenly distributed across the duration of the pair of matching base signals following the receiving; and
substantially assuring that the signal energy is evenly distributed across the spectrum of the pair of matching base signals following the receiving.

47. An imaging system comprising:
a transmission system with a time scale and time delay encoding system which applies one of a plurality of time scales and one of a plurality of time delays to one of a pair of matching base signals, combines the time scaled and time delayed base signal with the other one of the pair of base signals to form a doublet, and transmits the doublet into an environment which embeds imaging information in the doublet, wherein the applied one of the plurality of time scales is less than one; and
a receiving system which receives the doublet and extracts the imaging information from between the time scaled and time delayed base signal and the other one of the pair of base signals based on the one of the plurality of time scales and the one of the plurality of time delays which were applied.

48. The system as set forth in claim 47 wherein the transmission system further comprises:
a signal generator which generates the pair of matching base signals;
the encoding system modulates the one of the plurality of time scales and the one of the plurality of time delays onto the one of the pair of matching base signals;
a combiner which combines the time scaled and time delayed base signal with the other one of the pair of base signals to form the doublet; and
a transmitter which transmits the doublet into the environment which embeds the imaging information.

49. The system as set forth in claim 47 wherein the transmission system has a plurality of doublets with an independent one of a plurality of the time scale and independent one of the plurality of time delay applied to each of the doublets, combines all of the doublets to form a composite signal, and transmits the composite signal; and
wherein the receiving system receives the composite signal and extracts the information from each of the doublets that comprise the composite signal based on the respective one of the plurality of time scale and the one of the plurality of time delay that were applied to each of the doublets.

50. An imaging system comprising:
a transmission system with a time scale and time delay encoding system which applies one of a plurality of time scales and one of a plurality of time delays to one of a pair of matching base signals, wherein the applied one of the plurality of time scales is less than one, wherein the transmission system further comprises a pair of synchronized and spatially separated radiating elements, one radiating element radiates one of the matching base signals and the other radiating element radiates the time scaled and time delayed base signal into the environment which embeds the imaging information wherein the one of the matching base signals and the time scaled and the time delayed base signal combine in the environment to form a doublet; and a receiving system which receives the doublet and extracts the imaging information from between the time scaled and time delayed base signal and the other one of the pair of base signals based on the one of the plurality of time scales and the one of the plurality of time delays which were applied.

51. The system as set forth in claim 48 wherein the combiner is an adder or a subtractor.

52. The system as set forth in claim 47 wherein the transmission system further comprises:

a temporal equalizer which substantially assures that signal energy of the pair of matching base signals is evenly distributed across the duration of the pair of matching base signal; and a spectral equalizer which substantially assures that the signal energy is evenly distributed across the spectrum of the pair of matching base signals.

53. The system as set forth in claim 47 wherein the receiving system further comprises:

a segmentation device that receives the doublet and forms received segments from the received doublet;

a time scaling device which applies at least one of the plurality of time scales to each of the received segments to form time scaled signal segments;

a time delaying device which applies at least one of the plurality of time delays to each of the received segments to form time delayed signal segments;

a multiplier which multiplies each of the time scaled signal segments with each of the time delayed signal segments to form multiplied signals;

an integrator which integrates the multiplied signals across time to form detection signals; and a processing system which compares the detection signals at different ones of the plurality of time scales and different ones of the plurality of time delays over time to determine the applied one of the plurality of time scales and the applied one of the plurality of time delays to extract the imaging information from the detection signals.

54. The system as set forth in claim 53 wherein the receiving system further comprises:

a temporal equalizer which substantially assures that signal energy of the pair of matching base signals is evenly distributed across the duration of the pair of matching base signals; and a spectral equalizer which substantially assures that the signal energy is evenly distributed across the spectrum of the pair of matching base signals.

55. A method for imaging comprising:

applying one of a plurality of time scales and one of a plurality of time delays to one of a pair of matching base signals to encode information, wherein the applied one of the plurality of time scales is less than one;

combining the time scaled and time delayed base signal with the other one of the pair of base signals to form a doublet;

transmitting the doublet into the environment that embeds imaging information;

receiving the doublet; and extracting the imaging information from doublet between the time scaled and time delayed base signal and the other one of the pair of base signals based on the one of the plurality of time scales and on the one of the plurality of time delays which were applied.

56. A method for imaging comprising:

applying one of a plurality of time scales and one of a plurality of time delays to one of a pair of matching base signals to encode information, wherein the applied one of the plurality of time scales is less than one;

radiating one of the matching base signals from one of a pair of synchronized and spatially separated radiating elements;

radiating the time scaled and time delayed base signal from another one of the pair of synchronized and spatially separated radiating elements, wherein the radiated time scaled and time delayed base signal with the other one of the pair of base signals combine during the radiation to form a doublet; receiving the doublet; and extracting the imaging information from doublet between the time scaled and time delayed base signal and the other one of the pair of base signals based on the one of the plurality of time scales and on the one of the plurality of time delays which were applied.

57. The method as set forth in claim 56 further comprising providing a plurality of doublets with each of the doublets having an independent one of the plurality of time scales and an independent one of the plurality of time delays applied to each of the doublets, combining all of the doublets to form a composite signal, transmitting the composite signal into the environment which embeds the imaging information, receiving the composite signal, and extracting the imaging information from the doublets that comprise the composite signal based on the respective one of the plurality of time scales and one of the plurality of time delays which were applied to each of the doublets.

58. The method as set forth in claim 55 wherein the combining comprises adding or subtracting the time scaled and time delayed base signal with the other one of the pair of base signals to form the doublet.

59. The method as set forth in claim 55 further comprising:

substantially assuring that signal energy of the pair of matching base signals is evenly distributed across the duration of the pair of matching base signals prior to the transmitting; and substantially assuring that the signal energy is evenly distributed across the spectrum of the pair of matching base signals prior to the transmitting.

60. The method as set forth in claim 55 wherein the receiving further comprises:

segmenting the received doublet to form received segments;

applying at least one of the plurality of time scales to each of the received segments to form time scaled signal segments;

applying at least one of the plurality of time delays to each of the received segments to form time delayed signal segments;

multiplying each of the time scaled signal segments with each of the time delayed signal segments to form multiplied signals;

integrating the multiplied signals across time to form detection signals; and processing the detection signals at different ones of the plurality of time scales and different ones of the plurality of time delays over time to determine the applied one of the plurality of time scales and the applied one of the plurality of time delays to extract the imaging information from the determined detection signal.

61. The method as set forth in claim 60 further comprising:
substantially assuring that signal energy of the pair of matching base signals is evenly distributed across the duration of the pair of matching base signals following the receiving; and
substantially assuring that the signal energy is evenly distributed across the spectrum of the pair of matching base signals following the receiving.

62. The system as set forth in claim 1 wherein the transmission system applies the one of a plurality of time scales without spread-spectrum modulation.

63. The method as set forth in claim 12 wherein the applying further comprises applies one of the plurality of time scales without spread-spectrum modulation.

64. The system as set forth in claim 22 wherein the device that time scales the received signal time scales the received signal without spread-spectrum modulation.

65. The system as set forth in claim 23 wherein the processing system extracts the information from the doublet based on one of the plurality of time scales without spread spectrum modulation.

66. The system as set forth in claim 25 wherein the time scaling device applies the at least one of the plurality of time scales without spread spectrum modulation.

67. The system as set forth in claim 26 wherein the processing system extracts the information from the doublet based on one of the plurality of time scales without spread spectrum modulation.

68. The method as set forth in claim 27 wherein the extracting information from the composite signal based on one of the plurality of time scales is extracted based on one of the plurality of time scales without spread spectrum modulation.

69. The method as set forth in claim 28 wherein the extracting information from the doublet based on one of the plurality of time scales is extracted based on one of the plurality of time scales without spread spectrum modulation.

70. The method as set forth in claim 29 wherein the applying at least one of the plurality of time scales applies one of the plurality of time scales with spread spectrum modulation.

71. The method as set forth in claim 30 wherein the extracting information from the doublet based on one of the plurality of time scales is extracted based on one of the plurality of time scales without spread spectrum modulation.

72. The method as set forth in claim 31 wherein the extracting information from one of the pair of matching base signals in the doublet based on one of the plurality of time scales is extracted based on one of the plurality of time scales without spread spectrum modulation.

73. The system as set forth in claim 32 wherein the transmission system embeds communication information by applying one of the plurality of time scales without spread spectrum modulation.

74. The method as set forth in claim 40 wherein the applying one of the plurality of time scales is applied without spread spectrum modulation.

75. The system as set forth in claim 47 wherein the transmission system applies one of the plurality of time scales without spread spectrum modulation.

76. The method as set forth in claim 55 wherein the applying one of the plurality of time scales is applied without spread spectrum modulation.

77. The system as set forth in claim 1 wherein the time scaled and time delayed base signal and the other one of the pair of base signals which are combined into the doublet are matching in frequency.

78. The method as set forth in claim 12 wherein the time scaled and time delayed base signal combined with the other one of the pair of base signals to form the doublet are matching in frequency.

79. The system as set forth in claim 22 wherein the signals in the received doublet are matching in frequency.

80. The system as set forth in claim 23 wherein the signals in the received doublet are matching in frequency.

81. The system as set forth in claim 25 wherein the signals in the received doublet are matching in frequency.

82. The system as set forth in claim 26 wherein the signals in the received doublet are matching in frequency.

83. The method as set forth in claim 27 wherein the signals in each of the received doublets are matching in frequency.

84. The method as set forth in claim 28 wherein the signals in the received doublet are substantially matched in frequency.

85. The method as set forth in claim 29 wherein the signals in the received doublet are substantially matched in frequency.

86. The method as set forth in claim 30 wherein the signals in the received doublet are substantially matched in frequency.

87. The method as set forth in claim 31 wherein the signals in the received doublet are substantially matched in frequency.

88. The system as set forth in claim 32 wherein the signals in the received doublet are substantially matched in frequency.

89. The method as set forth in claim 40 wherein the signals in the received doublet are substantially matched in frequency.

90. The system as set forth in claim 47 wherein the signals in the received doublet are substantially matched in frequency.

91. The method as set forth in claim 55 wherein the signals in the received doublet are substantially matched in frequency.

* * * * *

UNITED STATES PATENT AND TRADEMARK OFFICE
CERTIFICATE OF CORRECTION

PATENT NO.       : 7,580,488 B2
APPLICATION NO. : 09/765712
DATED            : August 25, 2009
INVENTOR(S)      : Randy K. Young It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1607 days.

Signed and Sealed this

Fourteenth Day of December, 2010

David J. Kappos
*Director of the United States Patent and Trademark Office*